(12) United States Patent
Ward et al.

(10) Patent No.: US 9,063,739 B2
(45) Date of Patent: Jun. 23, 2015

(54) METHOD AND COMPUTER PROGRAM FOR DEVICE CONFIGURATION

(75) Inventors: Robert D. Ward, Bellevue, WA (US); Robert Michael Whapham, Richardson, TX (US); Joseph P. Kessler, Wylie, TX (US)

(73) Assignee: Open Invention Network, LLC, Durham, NC (US)

( * ) Notice: Subject to any disclaimer, the term of this patent is extended or adjusted under 35 U.S.C. 154(b) by 1020 days.

(21) Appl. No.: 11/515,967

(22) Filed: Sep. 5, 2006

(65) Prior Publication Data

US 2007/0055976 A1  Mar. 8, 2007

Related U.S. Application Data

(60) Provisional application No. 60/715,252, filed on Sep. 7, 2005.

(51) Int. Cl.
 G06F 9/44 (2006.01)
 H04L 12/24 (2006.01)
 H04L 29/08 (2006.01)
 H04L 12/28 (2006.01)

(52) U.S. Cl.
 CPC .............. *G06F 8/34* (2013.01); *H04L 41/0803* (2013.01); *H04L 41/0853* (2013.01); *H04L 41/0856* (2013.01); *H04L 41/0869* (2013.01); *H04L 41/0893* (2013.01); *H04L 41/22* (2013.01); *H04L 2012/2849* (2013.01); *H04L 67/36* (2013.01); *H04L 67/125* (2013.01)

(58) Field of Classification Search
 CPC ............ G06F 8/34; H04L 41/14; H04L 41/22
 USPC .................................................. 717/100–113
 See application file for complete search history.

(56) References Cited

U.S. PATENT DOCUMENTS

| | | | |
|---|---|---|---|
| 3,597,743 | A | 8/1971 | Murphy et al. |
| 3,778,542 | A | 12/1973 | Hanseman |
| 4,024,505 | A | 5/1977 | Sperling |
| 4,251,858 | A | 2/1981 | Cambigue et al. |
| 4,503,497 | A | 3/1985 | Krygowski et al. |

(Continued)

FOREIGN PATENT DOCUMENTS

| | | |
|---|---|---|
| EP | 0449632 A2 | 10/1991 |
| EP | 0530973 | 3/1993 |

(Continued)

OTHER PUBLICATIONS 10.4" Color LCD Tiltscreens, Oct. 1997, p. 1-2.

(Continued)

*Primary Examiner* — Ted T Vo
(74) *Attorney, Agent, or Firm* — Haynes and Boone, LLP

(57) ABSTRACT

A method and computer program are provided for graphically configuring devices in a control area network that includes providing one or more application programming interfaces, creating one or more graphical objects on a computer display using a graphical user interface, and associating one or more functions of an application programming interface with one or more of the devices using the graphical user interface. Each application programming interface corresponds to a class of devices and includes a set of functions. Each class of devices includes one or more devices. At least one of the graphical objects represents one or more of the devices.

103 Claims, 29 Drawing Sheets

(56) References Cited

U.S. PATENT DOCUMENTS

| | | |
|---|---|---|
| 4,530,069 A | 7/1985 | Desrochers |
| 4,700,230 A | 10/1987 | Pshtissky et al. |
| 4,786,847 A | 11/1988 | Daggett et al. |
| 4,790,003 A | 12/1988 | Kepley et al. |
| 4,876,651 A | 10/1989 | Dawson et al. |
| 4,882,747 A | 11/1989 | Williams |
| 4,904,993 A | 2/1990 | Sato |
| 4,914,527 A | 4/1990 | Asai et al. |
| 4,953,194 A | 8/1990 | Hansen et al. |
| 4,989,081 A | 1/1991 | Miyagawa et al. |
| 5,014,193 A | 5/1991 | Garner et al. |
| 5,039,980 A | 8/1991 | Aggers et al. |
| 5,051,720 A | 9/1991 | Kittirutsunetorn |
| 5,056,001 A | 10/1991 | Sexton |
| 5,072,374 A | 12/1991 | Sexton et al. |
| 5,086,385 A | 2/1992 | Launey et al. |
| 5,095,480 A | 3/1992 | Fenner |
| 5,103,391 A | 4/1992 | Barrett |
| 5,109,222 A | 4/1992 | Welty |
| 5,119,479 A | 6/1992 | Arai et al. |
| 5,144,548 A | 9/1992 | Salandro |
| 5,170,466 A | 12/1992 | Rogan et al. |
| 5,185,693 A | 2/1993 | Loftis et al. |
| 5,222,062 A | 6/1993 | Sharma et al. |
| 5,226,160 A | 7/1993 | Waldron et al. |
| 5,233,510 A | 8/1993 | Brueckner et al. |
| 5,237,567 A | 8/1993 | Nay et al. |
| 5,265,252 A | 11/1993 | Rawson, III et al. |
| 5,276,630 A | 1/1994 | Baldwin et al. |
| 5,276,793 A | 1/1994 | Borgendale et al. |
| 5,301,350 A | 4/1994 | Rogan et al. |
| 5,311,451 A | 5/1994 | Barrett |
| 5,317,562 A | 5/1994 | Nardin et al. |
| 5,347,632 A | 9/1994 | Filepp et al. |
| 5,371,859 A | 12/1994 | Lennartsson |
| 5,375,248 A | 12/1994 | Lemay et al. |
| 5,379,431 A | 1/1995 | Lemon et al. |
| 5,388,213 A | 2/1995 | Oppenheimer et al. |
| 5,410,326 A | 4/1995 | Goldstein |
| 5,428,470 A | 6/1995 | Labriola, II |
| 5,434,982 A | 7/1995 | Calzi |
| 5,444,851 A | 8/1995 | Woest |
| 5,446,740 A | 8/1995 | Yien et al. |
| 5,450,359 A | 9/1995 | Sharma et al. |
| 5,452,291 A | 9/1995 | Eisenhandler et al. |
| 5,455,959 A | 10/1995 | Simmering |
| 5,463,735 A | 10/1995 | Pascucci et al. |
| 5,467,264 A | 11/1995 | Rauch et al. |
| 5,481,750 A | 1/1996 | Parise et al. |
| 5,491,797 A | 2/1996 | Thompson et al. |
| 5,491,802 A | 2/1996 | Thompson et al. |
| 5,500,794 A | 3/1996 | Fujita et al. |
| 5,510,975 A | 4/1996 | Ziegler, Jr. |
| 5,519,707 A | 5/1996 | Subramanian et al. |
| 5,519,875 A | 5/1996 | Yokoyama et al. |
| 5,528,215 A | 6/1996 | Siu et al. |
| 5,528,739 A | 6/1996 | Lucas et al. |
| 5,537,142 A | 7/1996 | Fenouil |
| 5,537,663 A | 7/1996 | Belmont et al. |
| 5,557,723 A | 9/1996 | Holt et al. |
| 5,565,855 A | 10/1996 | Knibbe |
| 5,565,908 A | 10/1996 | Ahmad |
| 5,568,367 A | 10/1996 | Park |
| 5,568,489 A | 10/1996 | Yien et al. |
| 5,570,085 A | 10/1996 | Bertsch |
| 5,572,643 A | 11/1996 | Judson |
| 5,583,994 A | 12/1996 | Rangan |
| 5,586,267 A | 12/1996 | Chatwani et al. |
| 5,592,626 A | 1/1997 | Papadimitriou et al. |
| 5,594,366 A | 1/1997 | Khong et al. |
| 5,600,635 A | 2/1997 | Hamaki et al. |
| 5,630,079 A | 5/1997 | McLaughlin |
| 5,634,011 A | 5/1997 | Auerbach et al. |
| 5,648,813 A | 7/1997 | Tanigawa et al. |
| 5,657,221 A | 8/1997 | Warman et al. |
| 5,675,756 A | 10/1997 | Benton et al. |
| 5,687,393 A | 11/1997 | Brown et al. |
| 5,689,353 A | 11/1997 | Darbee et al. |
| 5,699,532 A | 12/1997 | Barrett et al. |
| 5,706,455 A | 1/1998 | Benton et al. |
| 5,710,755 A | 1/1998 | Chen |
| 5,720,032 A | 2/1998 | Picazo, Jr. et al. |
| 5,721,878 A | 2/1998 | Ottesen et al. |
| 5,724,574 A | 3/1998 | Stratigos et al. |
| 5,727,212 A | 3/1998 | Dinallo |
| 5,729,704 A | 3/1998 | Stone et al. |
| 5,732,257 A | 3/1998 | Atkinson et al. |
| 5,737,529 A | 4/1998 | Dolin, Jr. et al. |
| 5,737,553 A | 4/1998 | Bartok |
| 5,739,648 A | 4/1998 | Ellis et al. |
| 5,739,760 A | 4/1998 | Hatakeyama |
| 5,740,231 A | 4/1998 | Cohn et al. |
| 5,742,762 A | 4/1998 | Scholl et al. |
| 5,745,669 A | 4/1998 | Hugard et al. |
| 5,754,255 A | 5/1998 | Takamori |
| 5,764,155 A | 6/1998 | Kertesz et al. |
| 5,772,963 A | 6/1998 | Cantatore et al. |
| 5,777,870 A | 7/1998 | Takaku et al. |
| 5,796,411 A | 8/1998 | Cyman et al. |
| 5,805,812 A | 9/1998 | Fish et al. |
| 5,812,085 A | 9/1998 | Barraza et al. |
| 5,812,122 A | 9/1998 | Ng |
| 5,812,214 A | 9/1998 | Miller |
| 5,812,750 A | 9/1998 | Dev et al. |
| 5,815,516 A | 9/1998 | Aaker et al. |
| 5,815,703 A | 9/1998 | Copeland et al. |
| 5,819,294 A | 10/1998 | Chambers |
| 5,831,610 A | 11/1998 | Tonelli et al. |
| 5,835,126 A | 11/1998 | Lewis |
| 5,844,572 A | 12/1998 | Schott |
| 5,848,054 A | 12/1998 | Mosebrook et al. |
| 5,857,199 A | 1/1999 | Tamano et al. |
| 5,867,484 A | 2/1999 | Shaunfield |
| 5,886,894 A | 3/1999 | Rakoff |
| 5,892,924 A | 4/1999 | Lyon et al. |
| 5,896,382 A | 4/1999 | Davis et al. |
| 5,907,485 A | 5/1999 | Van Loo et al. |
| 5,907,837 A | 5/1999 | Ferrel et al. |
| 5,909,570 A | 6/1999 | Webber |
| 5,910,954 A | 6/1999 | Bronstein et al. |
| 5,918,022 A | 6/1999 | Batz et al. |
| 5,920,694 A | 7/1999 | Carleton et al. |
| 5,922,050 A | 7/1999 | Madany |
| 5,926,187 A | 7/1999 | Kim |
| 5,933,816 A | 8/1999 | Zeanah et al. |
| 5,935,003 A | 8/1999 | Stephens et al. |
| 5,938,728 A | 8/1999 | Dwork et al. |
| 5,940,387 A | 8/1999 | Humpleman |
| 5,943,064 A | 8/1999 | Hong et al. |
| 5,949,438 A | 9/1999 | Cyman et al. |
| 5,956,487 A | 9/1999 | Venkatraman et al. |
| 5,957,985 A | 9/1999 | Wong et al. |
| 5,959,536 A | 9/1999 | Chambers et al. |
| 5,968,116 A | 10/1999 | Day, II et al. |
| 5,977,989 A | 11/1999 | Lee et al. |
| 5,982,445 A | 11/1999 | Eyer et al. |
| 5,995,753 A | 11/1999 | Walker |
| 5,996,022 A | 11/1999 | Krueger et al. |
| 6,005,861 A | 12/1999 | Humpleman |
| 6,008,735 A | 12/1999 | Chiloyan et al. |
| 6,012,113 A | 1/2000 | Tuckner |
| 6,021,433 A | 2/2000 | Payne et al. |
| 6,023,762 A | 2/2000 | Dean et al. |
| 6,029,092 A | 2/2000 | Stein |
| 6,032,202 A | 2/2000 | Lea et al. |
| 6,038,668 A | 3/2000 | Chipman et al. |
| 6,049,821 A | 4/2000 | Theriault et al. |
| 6,049,828 A | 4/2000 | Dev et al. |
| 6,052,683 A | 4/2000 | Irwin |
| 6,052,750 A | 4/2000 | Lea |
| 6,055,236 A | 4/2000 | Nessett et al. |
| 6,055,368 A | 4/2000 | Kunioka |
| 6,061,602 A | 5/2000 | Meyer |
| 6,061,717 A | 5/2000 | Carleton et al. |

(56) References Cited

U.S. PATENT DOCUMENTS

| | | |
|---|---|---|
| 6,065,068 A | 5/2000 | Foote |
| 6,075,776 A | 6/2000 | Tanimoto et al. |
| 6,078,747 A | 6/2000 | Jewitt |
| 6,078,952 A | 6/2000 | Fielding et al. |
| 6,085,238 A | 7/2000 | Yuasa et al. |
| 6,085,243 A | 7/2000 | Fletcher et al. |
| 6,088,717 A | 7/2000 | Reed et al. |
| 6,101,189 A | 8/2000 | Tsuruoka |
| 6,105,055 A | 8/2000 | Pizano et al. |
| 6,108,696 A | 8/2000 | Mendhekar et al. |
| 6,115,713 A | 9/2000 | Pascucci et al. |
| 6,121,593 A | 9/2000 | Mansbery et al. |
| 6,128,509 A | 10/2000 | Veijola et al. |
| 6,131,097 A | 10/2000 | Peurach et al. |
| 6,133,847 A | 10/2000 | Yang |
| 6,134,590 A | 10/2000 | Perlman |
| 6,144,993 A | 11/2000 | Fukunaga et al. |
| 6,160,796 A | 12/2000 | Zou et al. |
| 6,161,133 A | 12/2000 | Kikinis |
| 6,161,145 A | 12/2000 | Bainbridge et al. |
| 6,167,567 A | 12/2000 | Chiles et al. |
| 6,175,920 B1 | 1/2001 | Schanze |
| 6,177,945 B1 | 1/2001 | Pleyer |
| 6,192,282 B1 | 2/2001 | Smith et al. |
| 6,195,688 B1 | 2/2001 | Caldwell et al. |
| 6,198,479 B1 | 3/2001 | Humpleman et al. |
| 6,199,133 B1 | 3/2001 | Schnell |
| 6,205,465 B1 | 3/2001 | Schoening et al. |
| 6,240,554 B1 | 5/2001 | Fenouil |
| 6,241,156 B1 | 6/2001 | Kline et al. |
| 6,247,128 B1 | 6/2001 | Fisher et al. |
| 6,259,707 B1 | 7/2001 | Dara-Abrams et al. |
| 6,260,069 B1 | 7/2001 | Anglin |
| 6,266,339 B1 | 7/2001 | Donahue et al. |
| 6,272,134 B1 | 8/2001 | Bass et al. |
| 6,272,553 B2 | 8/2001 | Way et al. |
| 6,282,175 B1 | 8/2001 | Steele et al. |
| 6,288,716 B1 | 9/2001 | Humpleman et al. |
| 6,292,901 B1 | 9/2001 | Lys et al. |
| 6,310,879 B2 | 10/2001 | Zhou et al. |
| 6,311,149 B1 | 10/2001 | Ryan et al. |
| 6,311,320 B1 | 10/2001 | Jibbe |
| 6,330,238 B1 | 12/2001 | Ooe |
| 6,338,152 B1 | 1/2002 | Fera et al. |
| 6,340,977 B1 | 1/2002 | Lui et al. |
| 6,342,906 B1 | 1/2002 | Kumar et al. |
| 6,360,270 B1 | 3/2002 | Cherkasova et al. |
| 6,363,422 B1 | 3/2002 | Hunter et al. |
| 6,374,255 B1 | 4/2002 | Peurach et al. |
| 6,415,328 B1 | 7/2002 | Korst |
| 6,434,157 B1 | 8/2002 | Dube' et al. |
| 6,434,680 B2 | 8/2002 | Belknap et al. |
| 6,437,691 B1 | 8/2002 | Sandelman et al. |
| 6,446,130 B1 | 9/2002 | Grapes |
| 6,456,699 B1 | 9/2002 | Burg et al. |
| 6,469,695 B1 | 10/2002 | White |
| 6,469,987 B1 | 10/2002 | Rijhsinghani |
| 6,477,569 B1 | 11/2002 | Sayan et al. |
| 6,484,061 B2 | 11/2002 | Papadopoulos et al. |
| 6,484,149 B1 | 11/2002 | Jammes et al. |
| 6,496,927 B1 | 12/2002 | McGrane et al. |
| 6,505,146 B1 | 1/2003 | Blackmer |
| 6,515,680 B1 | 2/2003 | Hendricks et al. |
| 6,523,696 B1 | 2/2003 | Saito et al. |
| 6,542,165 B1 | 4/2003 | Ohkado |
| 6,546,405 B2 | 4/2003 | Gupta et al. |
| 6,553,418 B1 | 4/2003 | Collins et al. |
| 6,574,234 B1 | 6/2003 | Myer et al. |
| 6,609,127 B1 | 8/2003 | Lee et al. |
| 6,615,088 B1 | 9/2003 | Myer et al. |
| 6,615,285 B1 | 9/2003 | Schafranek et al. |
| 6,657,646 B2 | 12/2003 | Partridge et al. |
| 6,680,934 B1 | 1/2004 | Cain |
| 6,697,376 B1 | 2/2004 | Son et al. |
| 6,744,771 B1 | 6/2004 | Barber et al. |
| 6,760,760 B1 | 7/2004 | McGrane |
| 6,763,040 B1 | 7/2004 | Hite et al. |
| 6,766,519 B1 | 7/2004 | Burriss et al. |
| 6,775,654 B1 | 8/2004 | Yokoyama et al. |
| 6,783,040 B2 | 8/2004 | Batchelor |
| 6,791,554 B1 | 9/2004 | Mergard et al. |
| 6,801,331 B1 | 10/2004 | Motoyama |
| 6,801,529 B1 | 10/2004 | McGrane et al. |
| 6,829,368 B2 | 12/2004 | Meyer et al. |
| 6,865,596 B1 | 3/2005 | Barber et al. |
| 6,868,403 B1 | 3/2005 | Wiser et al. |
| 6,934,414 B2 | 8/2005 | Kondo et al. |
| 6,937,766 B1 | 8/2005 | Wilf et al. |
| 6,959,451 B1 | 10/2005 | Ramanathan |
| 7,076,153 B2 | 7/2006 | Ando et al. |
| 7,213,061 B1 | 5/2007 | Hite et al |
| 7,224,366 B2 | 5/2007 | Kessler et al. |
| 7,426,702 B2 | 9/2008 | Partridge et al. |
| 7,971,151 B2 * | 6/2011 | Nixon et al. .................. 715/771 |
| 2002/0013948 A1 | 1/2002 | Aguayo et al. |
| 2002/0056047 A1 | 5/2002 | Lehman |
| 2002/0109708 A1 | 8/2002 | Peurach et al. |
| 2002/0161828 A1 | 10/2002 | Edison et al. |
| 2002/0176601 A1 | 11/2002 | Rhoads |
| 2003/0035556 A1 | 2/2003 | Curtis et al. |
| 2003/0087629 A1 | 5/2003 | Juitt et al. |
| 2003/0149574 A1 | 8/2003 | Rudman |
| 2003/0163298 A1 | 8/2003 | Odom et al. |
| 2004/0034864 A1 | 2/2004 | Barrett et al. |
| 2004/0044742 A1 | 3/2004 | Evron et al. |
| 2004/0073707 A1 | 4/2004 | Dillon |
| 2004/0075694 A1 | 4/2004 | Partridge et al. |
| 2004/0085361 A1 | 5/2004 | Kessler et al. |
| 2004/0196255 A1 | 10/2004 | Cheng |
| 2005/0273700 A1 | 12/2005 | Champion et al. |
| 2006/0067341 A1 | 3/2006 | Barber et al. |
| 2007/0191986 A1 | 8/2007 | Van Breemen |
| 2007/0211691 A1 | 9/2007 | Barber et al. |
| 2008/0059622 A1 | 3/2008 | Hite et al. |
| 2008/0313316 A1 | 12/2008 | Hite et al. |

FOREIGN PATENT DOCUMENTS

| | | |
|---|---|---|
| EP | 0626635 | 11/1994 |
| EP | 0658899 | 6/1995 |
| EP | 0743595 A2 | 11/1996 |
| EP | 0798894 | 10/1997 |
| EP | 0812086 | 12/1997 |
| EP | 0841615 | 5/1998 |
| EP | 0841616 | 5/1998 |
| EP | 0915469 | 5/1999 |
| EP | 0939517 | 9/1999 |
| EP | 1359482 A1 | 11/2003 |
| JP | 10040080 A | 2/1998 |
| JP | 10276478 | 10/1998 |
| WO | WO-9521415 A1 | 8/1995 |
| WO | WO-9624231 A1 | 8/1996 |
| WO | WO-9718636 A2 | 5/1997 |
| WO | WO-9726587 A1 | 7/1997 |
| WO | WO-9744747 | 11/1997 |
| WO | WO-9800788 A1 | 1/1998 |
| WO | WO-9811510 A1 | 3/1998 |
| WO | WO-9836335 A2 | 8/1998 |
| WO | WO-9836336 A1 | 8/1998 |
| WO | WO-9853581 A1 | 11/1998 |
| WO | WO-9903255 A1 | 1/1999 |
| WO | WO-9905584 | 2/1999 |
| WO | WO-9924905 | 5/1999 |
| WO | WO-0028403 A1 | 5/2000 |
| WO | WO-0067134 A1 | 11/2000 |
| WO | WO-0067135 | 11/2000 |
| WO | WO-0067140 A1 | 11/2000 |
| WO | WO-0067141 A1 | 11/2000 |
| WO | WO-0075738 | 12/2000 |
| WO | WO-0075767 A1 | 12/2000 |
| WO | WO-0075774 A2 | 12/2000 |
| WO | WO-0075870 A1 | 12/2000 |
| WO | WO-0075901 A2 | 12/2000 |
| WO | WO-0075903 | 12/2000 |

(56) References Cited

FOREIGN PATENT DOCUMENTS

| WO | WO-0076123 A2 | 12/2000 |
|---|---|---|
| WO | WO-0076127 A1 | 12/2000 |
| WO | WO-0076169 A2 | 12/2000 |
| WO | WO-0076174 A1 | 12/2000 |
| WO | WO-0076207 A1 | 12/2000 |
| WO | WO-0076208 A2 | 12/2000 |
| WO | WO-2006029391 A2 | 3/2006 |
| WO | WO-2007030421 A2 | 3/2007 |

OTHER PUBLICATIONS 8.5" Touch Panels, Oct. 1995, p. 1-2.
Aether Software, "ScoutWebTM Web-Enabling the Mobile Enterprise," http://www.riverbedtech.com/scoutware/index.phtml?i=sw, dated May 25, 2000; 11 pages.
AMX Celebrates Significant Dynamic Device Discovery Protocol Milestones at Infocomm 2006, Jun. 7, 2006, p. 1-2.
AMX Extends NetLinx™ With Java™ for Industry's First Dual Language Control, Sep. 10, 2004.
AMX Instruction Manual—Café Duet™—Integrated Development Environment for NetLinx Duet (Version 1.7)—User's Guide, Apr. 6, 2006, p. 1-2.
AMX Instruction Manual—Design XPress—Home Theater Version 1.2, Advanced Programmer's Guide, 2003, p. 1-36.
AMX Instruction Manual—Design XPress—Home Theater Version 1.3, On-Site Installer's Guide, 2005, p. 1-30.
AMX Instruction Manual—Design XPress—Home Theater Version 1.3, Programmer's Guide, 2005, p. 109.
AMX Instruction Manual—Design XPress—Home Theater Version 1.3, User Interface Guide, 2005, p. 1-43.
AMX Instruction Manual—Design XPress—Professional Version 1.1, On-Site Installer's Guide, 2004, p. 1-16.
AMX Instruction Manual—Design XPress—Professional Version 1.1, Programmer's Guide, Aug. 11, 2004, p. 153.
AMX Instruction Manual—Design XPress—Professional Version 1.1, User-Interface Guide, 2004, p. 1-43.
AMX Instruction Manual—Design XPress for NetLinx Studio Version 1.5, Programmer's Guide, 2005, p. 1-68.
AMX Instruction Manual—Design XPress for NetLinx Studio Version 1.5, User Interface Guide, 2005, p. 1-53.
AMX Instruction Manual—Design XPress for NetLinx Studio, On-Site Installer's Guide, 2002, p. 1-16.
AMX Instruction Manual—Design XPress for NetLinx Studio, Step-by-Step User's Guide, 2002, p. 1-32.
AMX Instruction Manual—Design XPress for NetLinx Studio, Version 1.5, Installer's Guide, 2005, p. 1-43.
AMX Instruction Manual—Standard NetLinx API (SNAPI) R 1.6.0, Dec. 19, 2005, 1-190.
AMX Partners With Leading Manufacturers to Leverage Dynamic Device Discovery Technology, Jun. 8, 2005, p. 1-3.
AMX Revolutionizes Touch Panel Interaction with Launch of TakeNote™ Interactive Collaboration Tool, Jun. 9, 2004, p. 1-2.
AXB-TPI/3 Touch Panel Interface 3, May 1999, p. 1-2.
AXCESS Language Tutorial—Version 2.1, Mar. 1993, p. 1-160.
Baier, et al., Multimedia Middleware for the Future Home, ACM, 2001, p. 48-51, entire reference.
Cellular Unlimited, "Cellular Unlimited Rogers AT&T . . . on Pagers and Wireless Web Browser," http://www.cantel-amigo.com/blackberry.html, dated May 25, 2000, 5 pages.
Ceroview, "Touch Screens," internet website article located at: www.ceroview.com/peripherals/touchspecs/touchtech.html, dated May 11, 2004, 3 pages.
Cisco and Infoseek Align With Panja to Bring Rich Internet Content to 2 Billion Consumer Devices, Jul. 19, 1999, p. 1-3.
Comer, Douglas E., "Internetworking With TCP/IP" vol. I, Principles, Protocols, and Architecture, published 1995, pp. 89-94, 203-207 and 291-292 (1995).
Corcoran, P.M., et al, "CEBus Network Access via the World Wide Web," p. 236-237, IEE Transactions on Consumer Electronics, Aug. 1996.
Corcoran, Peter M., et al., "Browser-Style Interfaces to a Home Automation Network," IEEE Transactions on Consumer Electronics, vol. 43 (No. 4), p. 1063-1069 (Nov. 1, 1997).
"Crestron SpectrumTM STX-3500C 2 Way RF Wireless Touchscreen Control Panel," Crestron Remote Control Systems, Nov. 1997.
Cucos, Alexander, et al., "Real Time ATM for remote access to Home Automation and Digital Home A/V Networks," IEEE, vol. 44 (No. 3) p. 482-489 (Jun. 17, 1998).
Desbonnet, Joe, et al., "System Architecture and Implementation of a CEBus/Internet Gateway," IEEE Transactions on Consumer Electronics (New York), vol. 43 (No. 4), p. 1057-1062, XP-00076, Nov. 1, 1997.
Droms, R. "Dynamic Host Configuration Protocol," RFC 1541, Oct. 1993, pp. 1-34.
Gagnon, F., et al., "On the Development of a Generic Interface for HLA and DIS Simulations," IEEE 1998, pp. 52-59, XP-002138396.
Global Connectivity Global WebLinx, 2000, p. 1-2.
Global WebLinx, 1999, p. 1-2.
Goodman, D., *Chapter 10: All About Buttons*, The Complete Hypercard Handbook, Bantam Computer Books (US), pp. 161-183; Dec. 19, 1988.
Gopal, Inder S., et al., Dynamic Address Assignment in Broadcast Networks' IEEE Transactions on Communications, vol. COM-34, No. 1, Jan. 1986, pp. 31-37 XP000811899.
Halsall, F., "Data Communications, Computer Networks and Open Systems," Addison-Wesley, p. 45-46 and 285-292 (1996)—XP-002162277.
Hedrick, C., "Routing Information Protocol," RFC 1058, Jun. 1988, pp. 1-29.
Hill Associates, Inc., "Remote Access and TCP/IP," Colchester, Vermont, dated Jan. 1998, pp. 616.3.1-616.3.11.
Instruction Manual—10.4" Touch Panels (Firmware Version G3), Jun. 2003, p. 1-67.
Instruction Manual—Mio R-1 Remote Control Device, Sep. 2005, p. 1-25.
Instruction Manual—VPXPress—ViewPoint System Design/Programming Software Program (Version 1.1 or higher), Jul. 2001, p. 1-37.
International Preliminary Examination Report Dated Feb. 24, 2001 from WO 2000/67135 (International App. No. PCT/US00/11796).
International Preliminary Examination Report Dated Apr. 10, 2001 from WO 2000/67134 (International App. No. PCT/US00/11797).
International Preliminary Examination Report Dated Jun. 5, 2001 from WO 2000/67141 (International App. No. PCT/US00/11853).
International Preliminary Examination Report Dated Jul. 4, 2001 from WO 2000/76208 (International App. No. PCT/US00/40160).
International Preliminary Examination Report Dated Jul. 7, 2001 from WO 2000/67140 (International App. No. PCT/US00/11851).
International Preliminary Examination Report Dated Sep. 4, 2001 from WO 2000/75767 (International App. No. PCT/US00/40097).
International Preliminary Examination Report Mailed Sep. 13, 2001 from WO 2000/75870 (International App. No. PCT/US00/15045).
International Preliminary Report on Patentability Dated Mar. 13, 2007 from WO 2006/029391 (International App. No. PCT/US05/32389).
International Preliminary Report on Patentability Dated Mar. 17, 2009 from WO 2007/030421 (International App. No. PCT/US06/34445).
International Search Report Mailed Jan. 22, 2001 from WO 2000/76123 (International App. No. PCT/US00/15631).
International Search Report Mailed Feb. 21, 2001 from WO 2000/75774 (International App. No. PCT/US00/15528).
International Search Report Mailed Mar. 14, 2001 from WO 2000/75903 (International App. No. PCT/US00/15762).
International Search Report Mailed Mar. 14, 2001 from WO 2000/76169 (International App. No. PCT/US00/15745).
International Search Report Mailed Mar. 21, 2001 from WO 2000/75901 (International App. No. PCT/US00/15742).
International Search Report Mailed Jul. 6, 2000 from WO 2000/67140 (International App. No. PCT/US00/11851).
International Search Report Mailed Jul. 9, 2008 from WO 2007/030421 (International App. No. PCT/US06/34445).

(56) References Cited

OTHER PUBLICATIONS

International Search Report Mailed Jul. 28, 2000 from WO 2000/67134 (International App. No. PCT/US00/11797).
International Search Report Mailed Aug. 29, 2000 from WO 2000/67141 (International App. No. PCT/US00/11853).
International Search Report Mailed Sep. 14, 2000 from WO 2000/67135 (International App. No. PCT/US00/11796).
International Search Report Mailed Sep. 19, 2000 from WO 2000/76207 (International App. No. PCT/US00/15620).
International Search Report Mailed Sep. 26, 2000 from WO 2000/75738 (International App. No. PCT/US00/15485).
International Search Report Mailed Sep. 27, 2000 from WO 2000/75767 (International App. No. PCT/US00/40097).
International Search Report Mailed Oct. 23, 2000 from WO 2000/76127 (International App. No. PCT/US00/14908).
International Search Report Mailed Oct. 26, 2000 from WO 2000/76174 (International App. No. PCT/US00/14898).
International Search Report Mailed Nov. 14, 2006 from WO 2006/029391 (International App. No. PCT/US05/32389).
International Search Report Mailed Nov. 15, 2000 from WO 2000/75870 (International App. No. PCT/US00/15045).
International Search Report Mailed Dec. 1, 2000 from WO 2000/76208 (International App. No. PCT/US00/40160).
Khosia, R., "Human-centered virtual machine of problem solving agents, software agents, intelligent agents . . .", IEEE High-Assurance Sys. Eng. Symp., pp. 312-319, Nov. 1998.
Klesper, Tilo, "Der Internet-Zugriff aufs Lon/Weltweiter Zugriff auf die Sensorik und Aktorik von Automatisierungs—Projekten," Elektronik (Germany), vol. 47 (No. 8), p. 60, 62, 64 and 66-68 (Aug. 1998), with unverified translation obtained from Examiner.
Landmark Designer—Instruction Manual—Preliminary, Oct. 2000, p. 1-225.
Landmark Designer 2.2 User Guide (Preliminary Copy), Mar. 1, 1999, p. 1-287.
Loucks, E. M., et al., "Implementation of a Dynamic Address Assignment Protocol in a Local Area Network" Computer networks and ISDN Sys., vol. 11, No. 2, Feb. 1986, pp. 133-146.
Mapquest Corporate: Copyright Information, internet website article located at: wysiwyg://89http://mapquest.c..ght &uid=udu49aj5i058jble:b51f7w5u2, dated May 25, 2000, 10 pages.
Microsoft WINHEC, Intel Development Tool for Implementing UPnP Devices, Microsoft Corp., 2003, p. 1-14, entire reference.
Mio R-1 Remote, Sep. 2005, p. 1-2.
NetLinx CardFrame, Control Cards, and NetModules—Instruction Manual—Preliminary May 2000, p. 1-49.
NetLinx Duet—Inconcert Partner Benefits, Sep. 2004.
NetLinx Duet, Sep. 2004.
NetLinx Hub Cards and Modules—Instruction Manual, Mar. 2000, p. 1-30.
NetLinx Master Cards and Modules—Instruction Manual—Preliminary, May 2000.
NetLinx Master Firmware—Version 3.0, Sep. 10, 2004, p. 1-34.
NetLinx Programming Language—Instruction Manual, May 2000, p. 1-184.
NetLinx Quick Setup Guide, Jun. 2000, p. 1-2.
New Products Infocomm '98, Jun. 1998, p. 1-20.
Nusser, et al., "The Java CAN API—a Java Gateway to Fieldbus Communication," Sep. 2000, IEEE.
NXI NetLinx Integrated Controller—Integrated Controllers—Instruction Manual—Preliminary, Nov. 2000, p. 1-35.
Omni Sky: Products and Services: Web "All the Web You Want," http://secure.omnisky.com/products...
d$LGPZLPIAAAJLTQFINQGSFEWAVBWAYIV0, dated May 25, 2000, 9 pages.
OSGI Alliance, "About the OSGi Service Platform—Technical Whitepaper" pamphlet dated Jul. 12, 2004, Revision 3.0, 17 pages.
OSGI Alliance, "OSGi Technology" internet website article located at: http://www.osgi.or/osgi_technology/index.asp?section=2, dated Aug. 6, 2004, 5 pages.
Palm OS®, "Web Clipping Development," internet website article located at: http://www.palmos.com/dev/tech/webclipping/, dated May 25, 2000, 18 pages.
Palm, Inc., "Web Clipping, Not Web Browsing," http://www.palm.com/products/palmvii/webclipping.html, dated May 25, 2000; 4 pages.
Panja Announces First Shipments of Panja 1000 Units, Jan. 24, 2000, p. 1-2.
Panja Ethernet Gateway, May 2000, p. 1-2.
Panja WebLinx Administrator Program (Version 1.0 or higher) Instruction Manual, Oct. 1999, p. 1-41.
Panja WebLinx Server and Internet Development Kit (IDK) (Version 1.02 or higher) Instruction Manual, Oct. 1999, p. 1-71.
Panja, "What is the Panja 1000?" internet website article located at: wysiwyg://33/http://www.buyapanja.com/, dated May 25, 2000, 3 pages.
Powered by AXlink, Oct. 1997, p. 1-16.
Quick Start Guide—AXB-TPI/3—Touch Panel Interface 3, Oct. 2002, p. 1-2.
Quick Start Guide—Mio R-1 Remote Control Device, Sep. 2005, p. 1-2.
Quick Start Guide, NXA-USBTN G4 USB Computer Control Stick with TakeNote, Jun. 9, 2004, p. 1-2.
Research in Motion Ltd., "BlackBerry Technical White Paper," Version 1.0, dated 1998-1999, 17 pages.
Tanenbaum, Andrew, "Computer Networks," Prentice Hall International (London), p. 345-403 (1996); XP-002155220.
TPDesign3—Touch Panel Design Program (Version 3.16), Dec. 2002, p. 1-47.
Tsuchiya, P.F., "Efficient Utilization of Two-Level Hierarchical Addresses," IEEE, vol. -, Dec. 6, 1992, pp. 1016-1021, XP000357710 ISBN: 0-7803-0608-2.
U.S. Appl. No. 09/328,032 entitled, "Method and System for Dynamically Assigning . . ." filed Jun. 8, 1999; Inventor: Barber et al., Abandoned.
U.S. Appl. No. 09/328,922 entitled "System and Method for Monitoring Video Inputs" filed Jun. 9, 1999; Inventor: Aaron Myer, Abandoned.
U.S. Appl. No. 09/328,923 entitled "System and Method for Integrating Multiple Video Switches into a Video Matrix" filed Jun. 9, 1999; Inventor: Aaron Myer et al., Abandoned.
U.S. Appl. No. 09/561,103 entitled "Dynamic Messaging System and Method" filed Apr. 28, 2000; Inventor: Thomas D. Hite et al., Abandoned.
U.S. Appl. No. 09/561,104 entitled "Internet Application Control System and Method" filed Apr. 28, 2000; Inventor: Thomas D. Hite, Abandoned.
U.S. Appl. No. 09/589,576 entitled "Method and System for Providing Access . . ." filed Jun. 7, 2000; Inventor: Thomas D. Hite, Abandoned.
U.S. Appl. No. 09/696,802, entitled "System and Method of Mining World Wide Web Content" filed Oct. 25, 2000, Inventor: Subramanian et al., Abandoned.
U.S. Appl. No. 60/715,252 entitled "Method and Computer Program for Device Configuration" filed Sep. 7, 2005; Inventors: Robert D. Ward et al., Expired.
U.S. Appl. No. 60/715,330 entitled "Remote Control With Power Management" filed Sep. 7, 2005; Inventor: Michael S. Farmer et al., Expired.
Reissue U.S. Appl. No. 11/219,300 entitled "System and Method of Device Interface Configuration for Control System" filed Sep. 2, 2005; Inventor: Aaron L. Myer et al.
University of Michigan, The Device Builder Module, www.eecs.umich.edu, Jul. 1997, pp. 1-6, entire reference.
Viewpoint Wireless Touch Panel, Jun. 1998, p. 1-2.
Wang, Qunjie, et al., "EM—an environment manager for building networked virtual environments" IEEE Virtual Reality Annual Intern. Symp., pp. 11-18, Mar. 1995.
Written Opinion Mailed Mar. 13, 2001 from WO 2000/75870 (International App. No. PCT/US00/15045).

(56) References Cited

OTHER PUBLICATIONS

Written Opinion Mailed Jul. 9, 2008 from WO 2007/030421 (International App. No. PCT/US06/34445).
Written Opinion Mailed Nov. 14, 2006 from WO 2006/029391 (International App. No. PCT/US05/32389).
Yahoo! Terms of Service, internet website article located at: http://docs.yahoo.com/info.terms/, dated May 25, 2000, 9 pages.
Tindell, K., "Guaranteeing Message Latencies on Control Area Network (CAN)," Proceedings of the 1st CAN International Conference, p. 1-11, Sep. 1994.
Krist, et al., "Generic System for On-line Optimization & the Implementation in a Benzene Plant", 1993, Process Development and Control Department, p. 517-524.
EP Supplemental Search Report and Written Opinion for EP06802916.4 mailed Jan. 6, 2012 (7 pages).

* cited by examiner

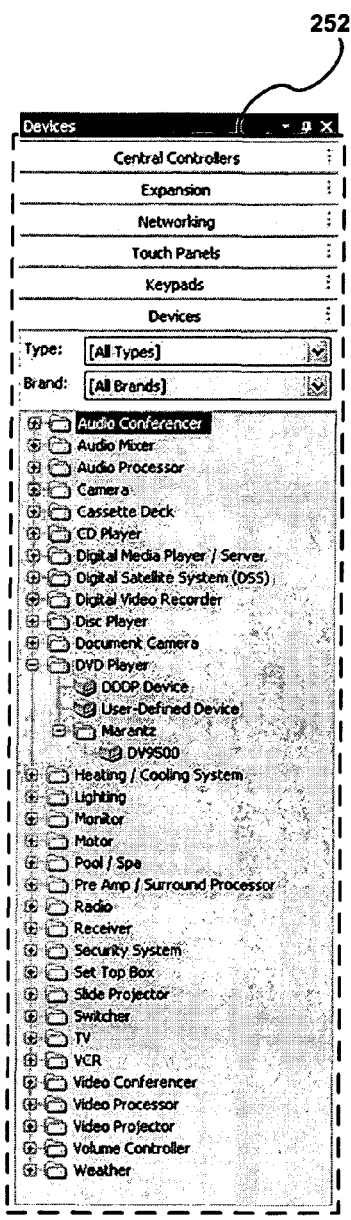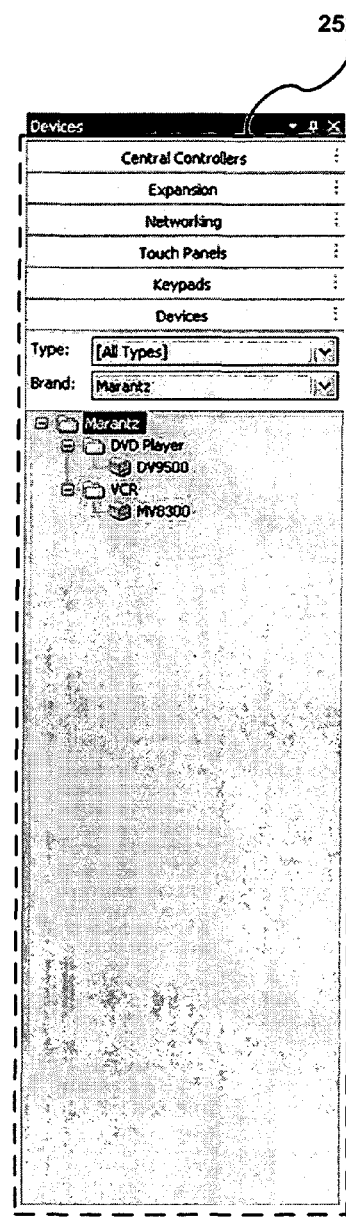
Figure 3B                    Figure 3C

460

```xml
- <root>
    - <versionInfo>
        <formatVersion>4</formatVersion>
        <graphicsVersion>3</graphicsVersion>
        <fileVersion> </fileVersion>
        <designVersion> </designVersion>
    </versionInfo>
    - <projectInfo>
        <protection>none</protection>
        <password encrypted="1"> </password>
        <panelType>MVP-7500</panelType>
        <fileRevision> </fileRevision>
        <dealerId> </dealerId>
        <jobName>test</jobName>
        <salesOrder> </salesOrder>
        <purchaseOrder> </purchaseOrder>
        <jobComment> </jobComment>
        <designerId> </designerId>
        <creationDate>Mon Aug 22 09:34:59 2005</creationDate>
        <revisionDate>Mon Aug 22 09:34:59 2005</revisionDate>
        <lastSaveDate>Mon Aug 22 09:35:27 2005</lastSaveDate>
        <fileName>test.TP4</fileName>
    </projectInfo>
    - <supportFileList>
        <mapFile>map.xma</mapFile>
        <colorFile>pal_001.xma</colorFile>
        <fontFile>fnt.xma</fontFile>
        <themeFile> </themeFile>
        <iconFile>icon.xma</iconFile>
        <externalButtonFile>external.xma</externalButtonFile>
    </supportFileList>
```

Figure 23

METHOD AND COMPUTER PROGRAM FOR DEVICE CONFIGURATION

CROSS REFERENCE TO RELATED APPLICATIONS

The present document claims the benefit of the earlier filing date of U.S. provisional patent application Ser. No. 60/715,252, entitled "METHOD AND COMPUTER PROGRAM FOR DEVICE CONFIGURATION," filed in the U.S. Patent and Trademark Office on Sep. 7, 2005, having common inventors as the present document, and is related to pending U.S. non-provisional patent application Ser. No. 11/222,885, entitled "METHOD, SYSTEM AND COMPUTER PROGRAM USING STANDARD INTERFACES FOR INDEPENDENT DEVICE CONTROLLERS," filed in the U.S. Patent and Trademark Office on Sep. 9, 2005, the entire contents of each of these applications is incorporated herein by reference.

BACKGROUND OF THE INVENTION

1. Field of the Invention

The present invention relates to graphical user interfaces and more particularly relates to a method and computer program for configuring devices using a graphical user interface.

2. Discussion of the Background

Through the use of a control system, various equipment or appliances in an environment, such as a home or business, can be computer-controlled to form an automated environment. The controlled equipment may include heating, ventilation and air conditioning (HVAC) systems, lighting systems, audio-visual systems, telecommunications systems, security systems, surveillance systems, and fire protection systems, for example. The equipment may be coupled to equipment controlling devices that are linked to a computer-based master controller through the use of a control area network. One or more user interface devices, such as a touch panels may also be linked to the control area network to accept user input and display current system status.

The configuration of devices generally and devices used in control area networks often requires the manual configuration and coding of such devices. Control System programming is a multi-step process requiring detailed knowledge of the system components and their relationships. The addition of new and custom devices that are encountered in the field adds to this complexity. Adding control for these devices is a complex process.

However, there does not currently exist a way to configure these devices that is efficient and able to handle configurations that range from simple to complex. Thus, there does not exist an efficient way in the prior art to configure such devices.

SUMMARY OF THE INVENTION

Accordingly, one aspect of the present invention is to provide a method for graphically configuring devices in a control area network that includes providing one or more application programming interfaces, creating one or more graphical objects using a graphical user interface, and associating at least one of the application programming interfaces. At least one of the application programming interfaces corresponds to a class of devices and includes a set of functions. Each class of devices includes one or more devices. At least one of the graphical objects represents one or more of the devices. Associating at least one of the application programming interfaces includes associating one or more of the functions of at least one of the application programming interfaces with one or more of the devices using the graphical user interface.

Another aspect one aspect of the present invention is to provide a computer program embodied in a computer readable medium for graphically configuring devices in a control area network that includes a first computer code for providing one or more application programming interfaces, a second computer code for creating one or more graphical objects using a graphical user interface, and a third computer code for associating at least one of the application programming interfaces. At least one of the application programming interfaces corresponds to a class of devices and includes a set of functions. Each class of devices includes one or more devices. At least one of the graphical objects represents one or more of the devices. Associating at least one of the application programming interfaces includes associating one or more of the functions of at least one of the application programming interfaces with one or more of the devices using the graphical user interface.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

FIGS. 3A-3D and FIGS. 4-22 illustrate an exemplary configuration computer program for configuring devices according to the present invention; and FIG. 23 is an exemplary XML file used for a touch panel design according to the present invention.

DETAILED DESCRIPTION OF THE PREFERRED EMBODIMENTS

Figure 1A:
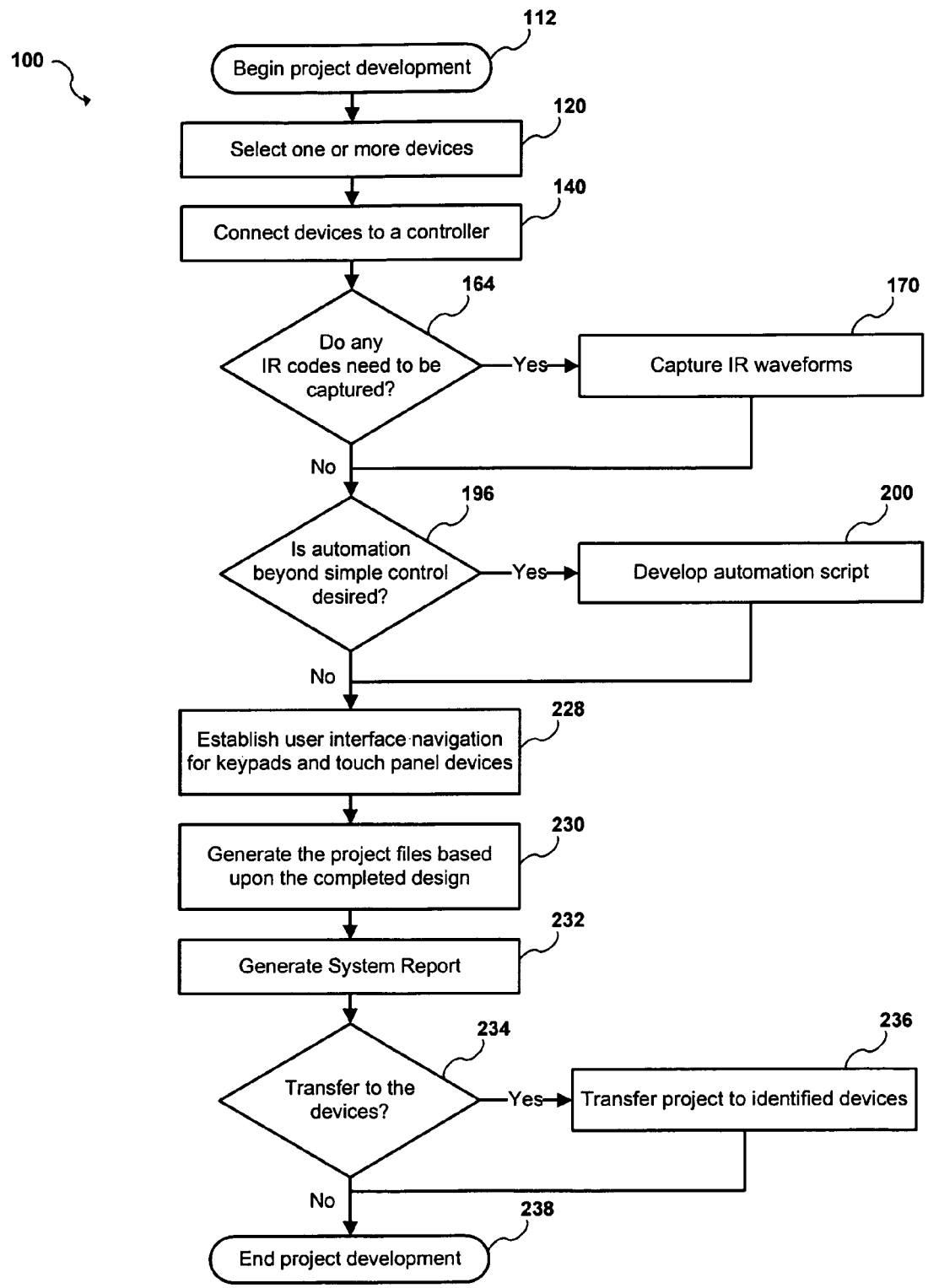
FIGS. 1A-1E are flow charts illustrating the process of configuring one or more devices according to the present invention.

Referring now to the drawings, wherein like reference numerals designate identical or corresponding parts throughout the several views, preferred embodiments of the present invention are described.

The present invention provides a user with the ability to configure devices using one or more graphical user interfaces ("GUI"). A GUI commonly represents data as graphical icons. Using the present invention, a user may easily design, program, integrate, and optionally document a complete system configuration using a drag-and-drop GUI environment. The configuration computer program is designed from the user interface point-of-view and adaptable to many different configurations, including one or more master controllers.

The configuration computer program may be used by a user to graphically specify one or more control systems, any controlled devices and the interconnection therebetween. The configuration program may also be used to graphically describe the user interface and the system relationship, functionality and operation. The configuration program may further be used to generate and transfer all appropriate information for system operation to the controller and/or appropriate devices.

Using the configuration computer program, a control system is configurable to include multiple hardware and device classes, including but not limited to, central controllers, expansion modules or cards, user interface devices and third party device classes. Hardware and device classes may be supplied by AMX corporation ("AMX"). Hardware and device classes may also include third-party products. For instance, third party device classes may include, but are not limited to: audio conference, audio processor, audio tape, audio tuner, camera, CD-ROM, computer control, digital media player or server, document camera, DSS, DVD DVR, HVAC, lighting, monitor, motor, picture frame, pool, preamp or surround processor, receiver, security, set top box, slide projector, spa, switcher, TV, VCR, video conference, video processor, video projector, volume controller, weather classes, and any other device class.

The configuration computer program can utilize a database of existing system devices or create new device classes on the fly. The database may be organized in any manner or form. For instance the data content may be organized by device class and contain available connectivity options, control modules and their functions (if applicable), as well as any events, such as hardware events, that may be triggered and handled in a user-defined manner. The database and access thereto may be configured such that updates are independent of new releases of the software.

In one embodiment, the device database is implemented in XML to facilitate easy manual content additions or updates. The database includes the ability to version and "drop in" a new database without the need for a new software release of the configuration computer program. The configuration computer program may be configured to recognize a database update when the configuration computer program is restarted or the user may choose to reload the database manually.

The configuration computer program may be configured to read the database contents upon startup and store the information into internal memory structures that will be made available to the application layer, also in a read-only fashion. The database contents may be keyed by device class and model number, with access either to the entire set of data or to a given device class. Acceptable device classes include, but are not limited to:

Central Controller
Expansion Module
Expansion Card
Networking Device
Touch Panel
Keypad/Remote The data gathered for each device may contain, but is not limited to: device description, connectivity options, programmable tactile buttons, and other programmable device events. Acceptable connectivity options include, but are not limited to:

TCP/IP
ICSNet
AXLink
Serial (RS-232, RS-422, RS-485)
IR
I/O
Relay
AMX Card Interface (mini or full-sized)
Audio (for NXC-VOL4; nameable but not connectable)
Video (for VSS2; nameable but not connectable)
Power (for PCS and PCS2; nameable but not connectable)

The present invention may utilize Duet modules and IR files. An "IR file" is a collection of representations of infrared ("IR") waveforms that are transmitted by an IR remote control. Each IR waveform is unique to a function of the remote control. A "Duet module" is a software library that includes one or more device specific protocol implementations and a mechanism to provide control of such devices. The control mechanism may utilize any technology including, but not limited to, metadata. In one embodiment, a third party device database may be created by scanning predetermined standard path locations for Duet modules and IR files. For example, the Duet modules and IR files may be respectively stored at the standard path locations:

"C:\Program Files\Common Files\AMXShare\Duet\module" and

"C:\Program Files\Common Files\AMXShare\Databases."

The user may optionally specify one or more additional paths for Duet modules and IR files. User paths may be configured to be searched before the standard locations, and in any order listed. If a module for a given device exists in multiple locations in the search paths, the first instance encountered may be entered into the database. However, other arrangements are possible, such as entering the last instance encountered. The database may optionally be rebuilt each time the configuration computer program initializes or during execution thereof as manually operated by the user. Upon changes to the search path or the manual operation by the user, the configuration computer program may be configured to perform a refresh of the database. A refresh of the database is much faster operation than a full rebuild. A refresh of the database removes the database control options or devices that no longer exist, adds new control options or devices, and updates existing control options or devices if changes have been made since the last refresh. The user interface elements which allow the user to change search paths, perform a full database rebuild or perform a database refresh may be configured to be available to the user only when no project is open. Further, database maintenance may be configured to not be allowed once a project has been created or opened.

In one embodiment, the devices and control options used are verified against the current state of the database. If a device or control option cannot be found, several options are available to the user including, but not limited to: performing a database refresh, replacing the missing device with a "user-defined" device of its device class, or aborting the open operation. If a missing module or IR file has been added to one of the search paths since the last database refresh, performing a database refresh may fix the project automatically. If the missing module or IR file no longer exists locally, but the user would like to open the project, replacing the missing device with a "user-defined" device of its device class replaces references to the missing items with a user-defined device. This device may then either be removed from the system by the user, replaced with another device, or its control mechanism may be defined by the user.

The configuration computer program may be used to create an Integrated Development Environment ("IDE") in which a control system can be designed, programmed and commissioned. Control System programming is a multi-step process requiring detailed knowledge of the system components and their relationships. However, the present invention simplifies this process. The configuration computer program may be configured to handle a wide variety of devices with the ability to handle new and custom devices as they are encountered in the field. Using the present invention, the addition of device control is thereby simplified.

The configuration computer program may be used to design a system and the relationship between the components. The configuration computer program provides a user with the ability to choose from a variety of AMX and/or third party devices to be controlled. For instance, such devices may be controlled by control devices, central controllers or user interfaces.

In one embodiment, the configuration computer program automatically creates standard programming. Custom programming may also be added to provide for advanced control system functionality. The configuration computer program easily allows a user to specify advanced programming and to modify existing advanced programming. Such programming may be configured to be automatically generated.

The configuration computer program is capable of configuring the user interfaces in the system. For each device to be controlled, the configuration computer program generates a series of user interface elements on one or more user interfaces to control the device and connect those elements to standard programming. Such standard programming may be automatically generated. The configuration computer program allows a user to customize the user interface design by adding or removing elements or changing the execution flow from one set of elements to another set of elements.

Upon completion of the system design, programming and user interface generation, the configuration computer program allows the user to download the generated file that relates to the control system and its peripherals. The configuration computer program may also be optionally configured to generate a report showing the system interconnects. Using this report a user may easily wire the system according a system design as configured by the configuration computer program.

The configuration computer program thus allows a user to easily design, program and commission the control system programming following a series of simple steps. The design and programming process is flexible enough to accommodate custom elements while keeping the process simple.

Prior to the present invention, there did not exist a way for a user to design, program and commission a system with a wide variety of devices and the ability to add new devices in the field as needed using a simple operation.

I. System Description

Referring to FIGS. 1A-1E, flow charts illustrating the process of configuring one or more devices are shown. At block 112, a user begins a development project. This may include the user creating a new project associated with this development project. At block 120, the user may use the configuration computer program to select one or more devices. These devices may include, but are not limited to, central controllers, expansion devices and user interface devices. The user may select one or more AMX devices or third party devices to control.

Figure 2:
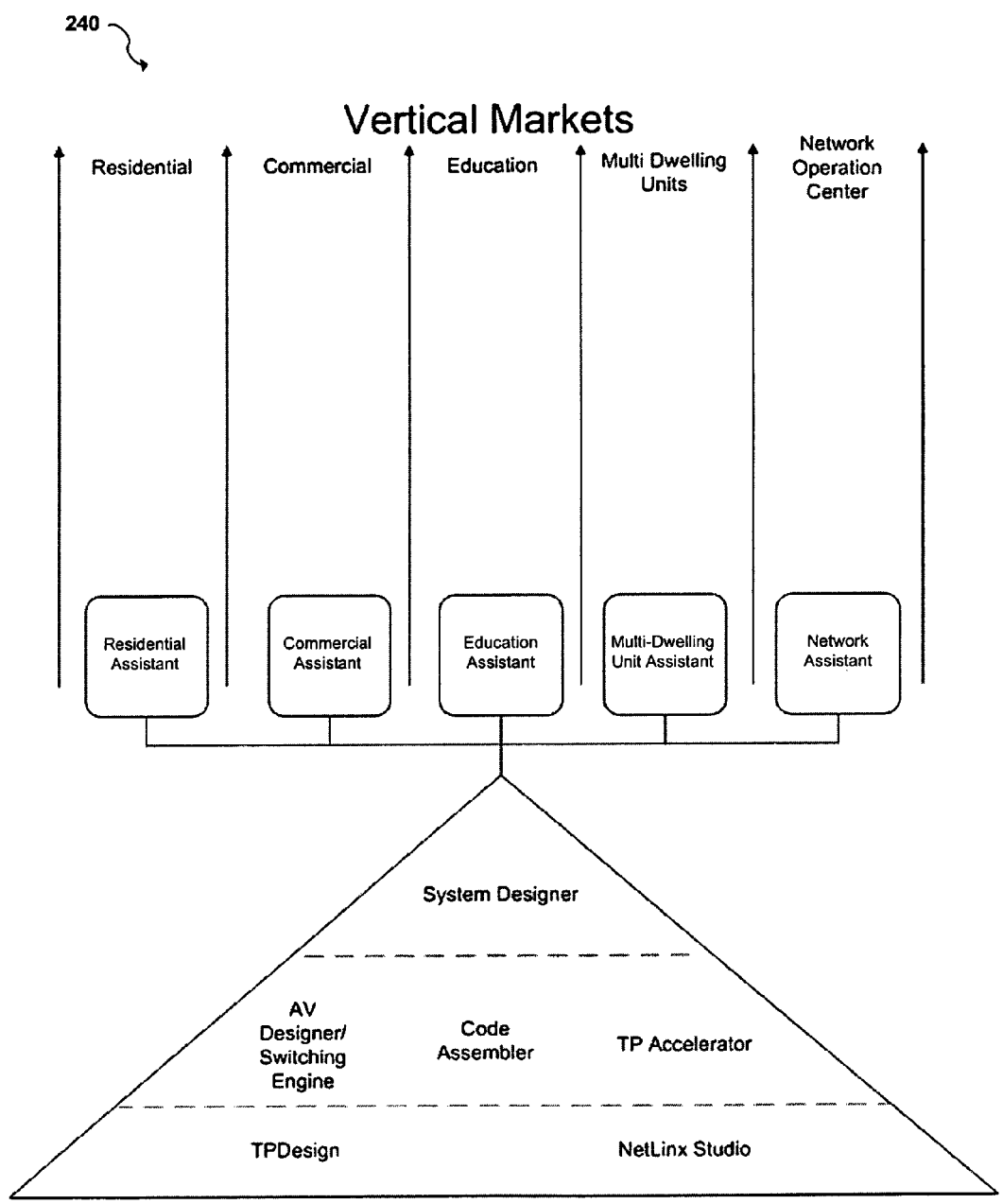
FIG. 2 illustrates an exemplary configuration computer program architecture and the vertical markets associated therewith according to the present invention.

In one embodiment, an assistant may be used to guide the user in selecting a central controller and one or more user interfaces and/or devices. The assistant may be configured to allow the user to select a basic system configuration including, but not limited to, a controller, a touch panel, and one or more keypads. The assistant allows the user to design more complex systems in a simple operation by automatically configuring popular device configurations. Possible assistants include, but are not limited to, a basic system assistant, a network assistant, a system expansion assistant, a residential assistant, a commercial assistant, an education assistant and a multi-dwelling unit assistant, as generally shown in FIG. 2.

Figure 4:
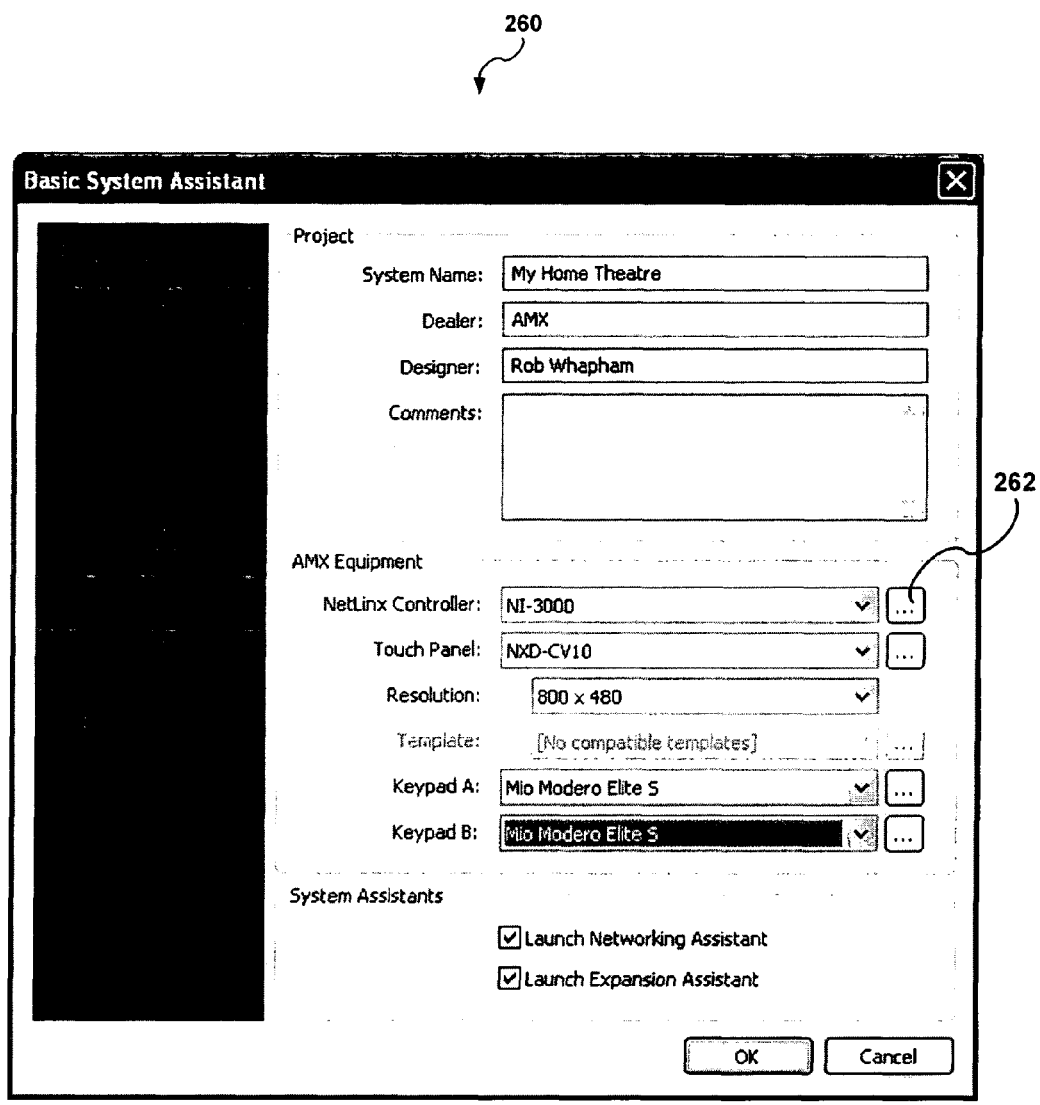
Figure 5:
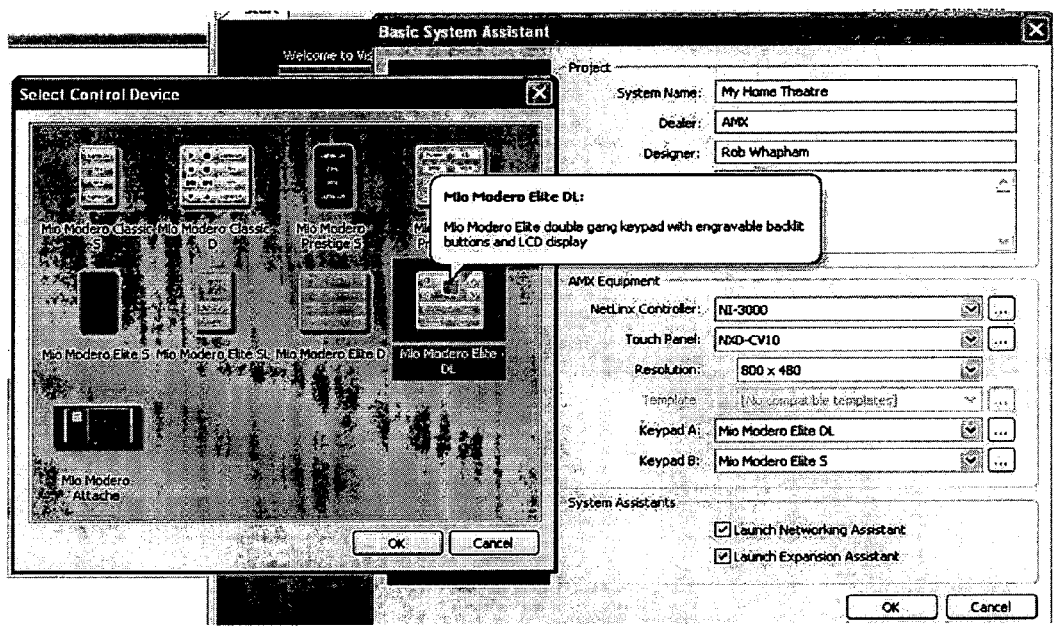

One possible non-limiting example of an assistant is a basic system assistant dialog 260 as shown in FIGS. 4 and 5. As shown in FIG. 4, a user may use the basic system assistant dialog 260 to configure a controller, a touch panel, and two keypads. The basic system assistant dialog 260 provides a method to get the project started. The user may view a graphical device selection dialog 270, as shown in FIG. 5, by selecting a selection button (e.g., selection button 262).

Figure 1B:
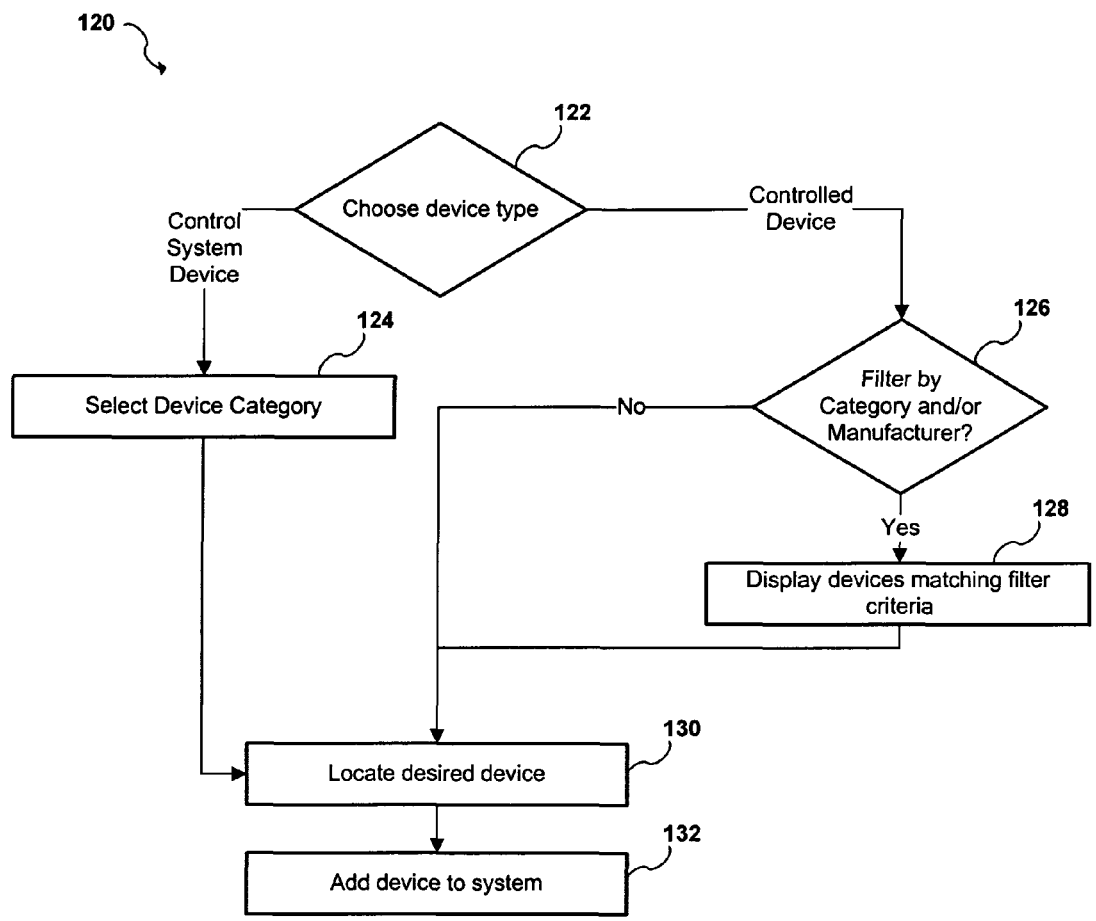
Figure 1C:
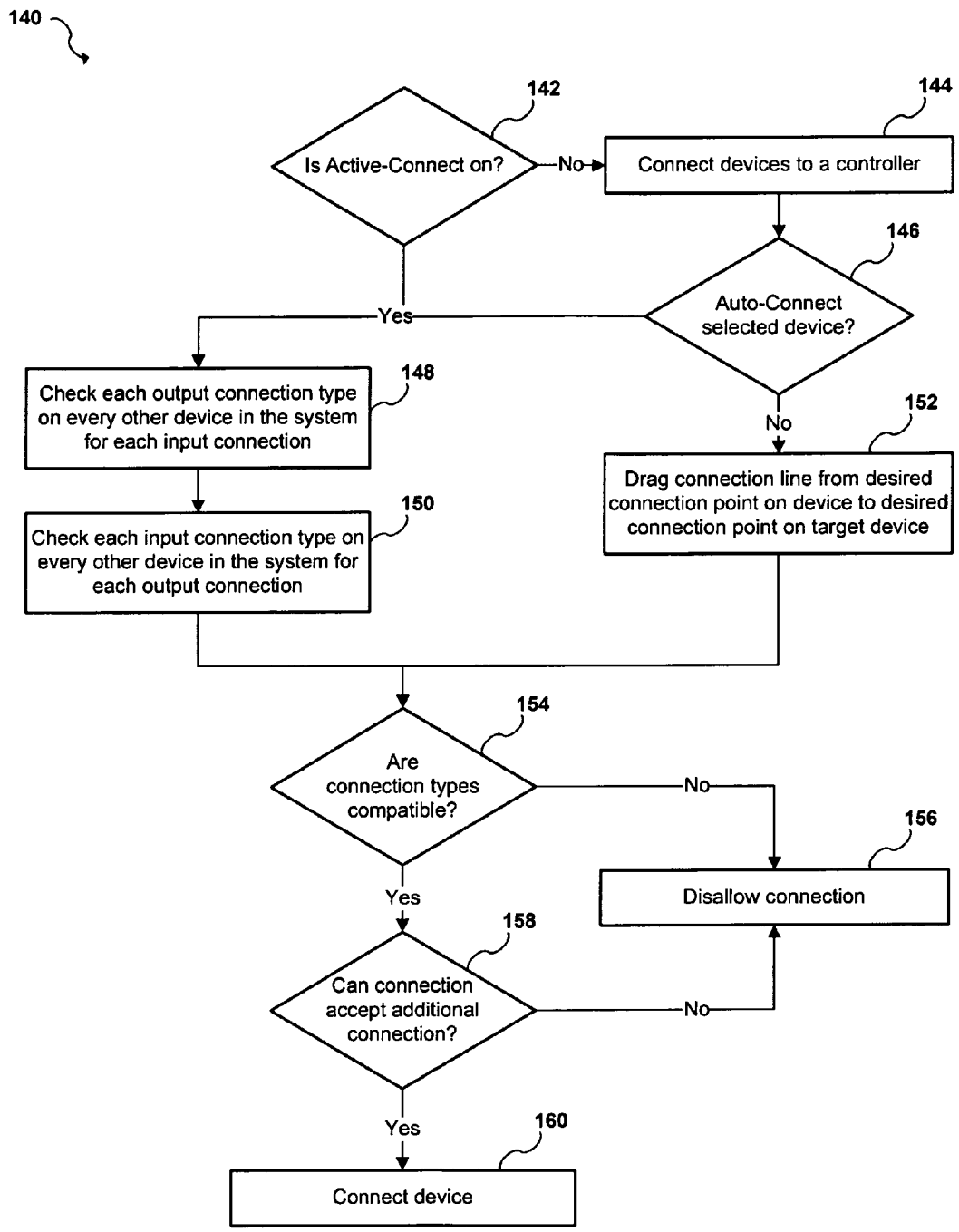

Selecting one or more devices, as shown in FIG. 1B, may include the following steps. At block 122, the user chooses a device type. Device types include, but are not limited to, control system devices and controlled devices. If the user selects a control system device, then the user next selects a device category at block 124. If the user selects a controlled device, then the user may next optionally filter the displayed devices by device category and/or manufacturer, at block 126. If the user desires to filter the displayed devices, then only those devices that match the desired filter are displayed, at block 128. At blocks 130 and 132, the desired device is respectively located and then added to the design of the system.

Figure 3A:
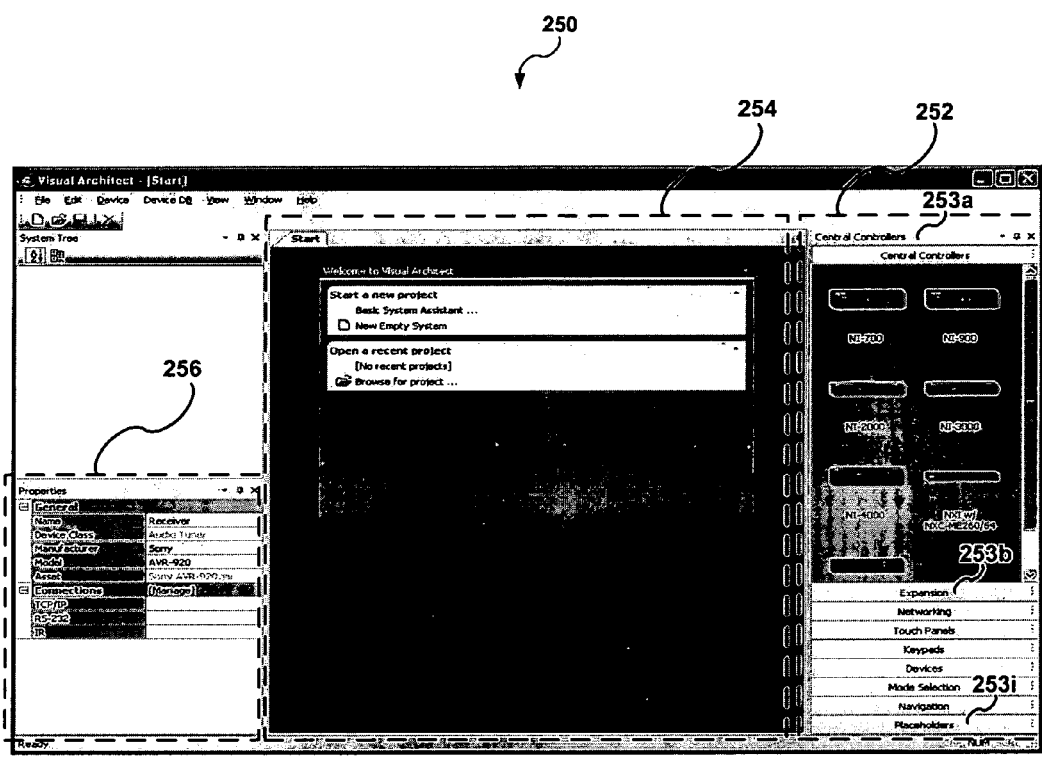

One possible non-limiting example of selecting one or more devices is illustrated in FIGS. 3A-D. A user may be presented with an initial screen 250 having a toolbar 252 that includes device categories represented as tabbed view areas (253a, 253b, . . . ). Each of the device categories has a device type of either a control system device or a controlled device. The user selects a device category by selecting a tabbed view 253a from the toolbar 252 and is presented with a list of devices. As shown in FIG. 3A, the user has selected a device category of "Central Controllers" which is represented by one or more visual icons each representing different devices.

Alternatively, as shown in FIG. 3B, the user has selected a device category of "Devices" from the toolbox 252. In this configuration, the "Devices" device category is associated with controlled devices and the user is presented with a textual list of devices shown as a collapsible tree. FIG. 3C shows a tabbed view of the "Devices" device category after it has been filtered for a particular manufacturer brand. Only those devices that match the desired filter are displayed.

Figure 10:
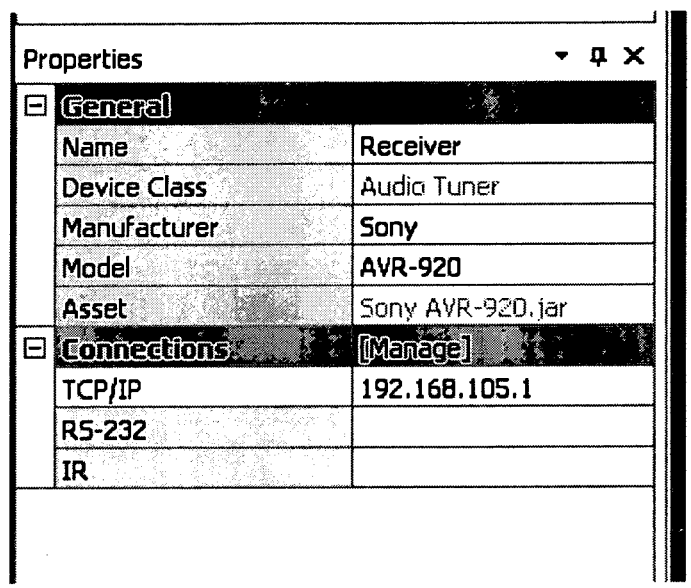

After the user has selected the desired device either textually or using the visual icon representing a particular device, the device may be added to the design of the system by any number of means including, but not limited to, right clicking on the icon and using a right menu option, double clicking on the icon, or dragging the icon into a workspace area 254. The user may then see the properties associated with a particular selected device in a properties window 256. An enlarged view of the properties window is shown in FIG. 10. The user may start a new system by adding or removing devices from the workspace area 254, or open and/or modify an existing system.

A previously noted, the configuration computer program may be used by the user to add the devices to the design of the system, connect these devices to the central controller and specify the relationships between the devices of the system. Connection nodes may be configured such that only compatible signal types may be connected.

Figure 3D:
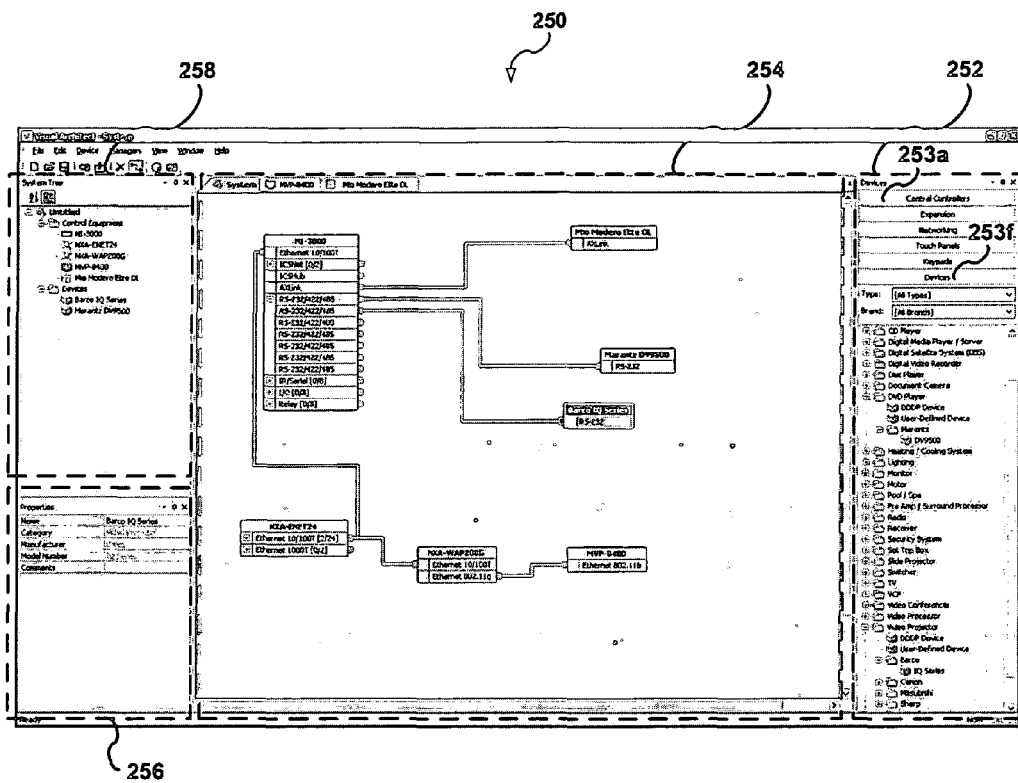

At block 140, the selected devices are connected to the central controller. Optionally, the configuration software program may be configured to automatically connect system components using a "best-fit" approach given at least some of the components in the system and the available signal types for the connections, if any, and the signal types applicable to the components. The connection of devices of block 140 is shown in detail in FIG. 1C. At block 142, a determination is made as to whether an active connection mode, or "best-fit" approach, has been activated. If the active connection mode has been activated, then at block 148 the output connection types on one or more devices in the system are checked against respective input connection types for matches. Likewise, the input connection types on one or more devices in the system are checked against respective output connection types for matches, at block 150. The "best-fit" approach may be configured to search devices in a hierarchal device category order that is most likely to find a compatible connection. If the active connection mode has not been activated, then at block 146 a determination is made as to whether the user wishes to manually perform a one-time auto-connection, or "best-fit" approach. If the user desires a one-time auto-connection, then blocks 148 and 150 are performed. If the user does not desire an auto-connection, the user may manually connect a desired connection point on a first device to a desired connection point on a second device, at block 152. One possible non-limiting example of connecting devices is shown in FIG. 3D. As shown in FIG. 3D, the devices are manually connected to target devices by dragging a connection line from a desired connection point on a first device to a desired connection point on a second device.

At block 154, a determination is made as to whether the connection types on the first and second devices are compatible. If connection types are incompatible, then the connection is disallowed, at block 156. Otherwise, a determination is made as to whether the connection can accept the additional connection, at block 158. If connection cannot accept the additional connection, then the connection is disallowed, again at block 156. Otherwise, a connection is established between the first and second devices, at block 160.

Selected devices may require additional control information, such as Infra-Red ("IR") codes, the configuration computer program allows the user to easily capture this information. At block 164, a determination is made as to whether the IR codes of the devices need to be captured. If one or more devices need to be captured, then at block 170 the capture of one or more IR waveforms that are associated with the one or more devices begins.

Figure 1D:
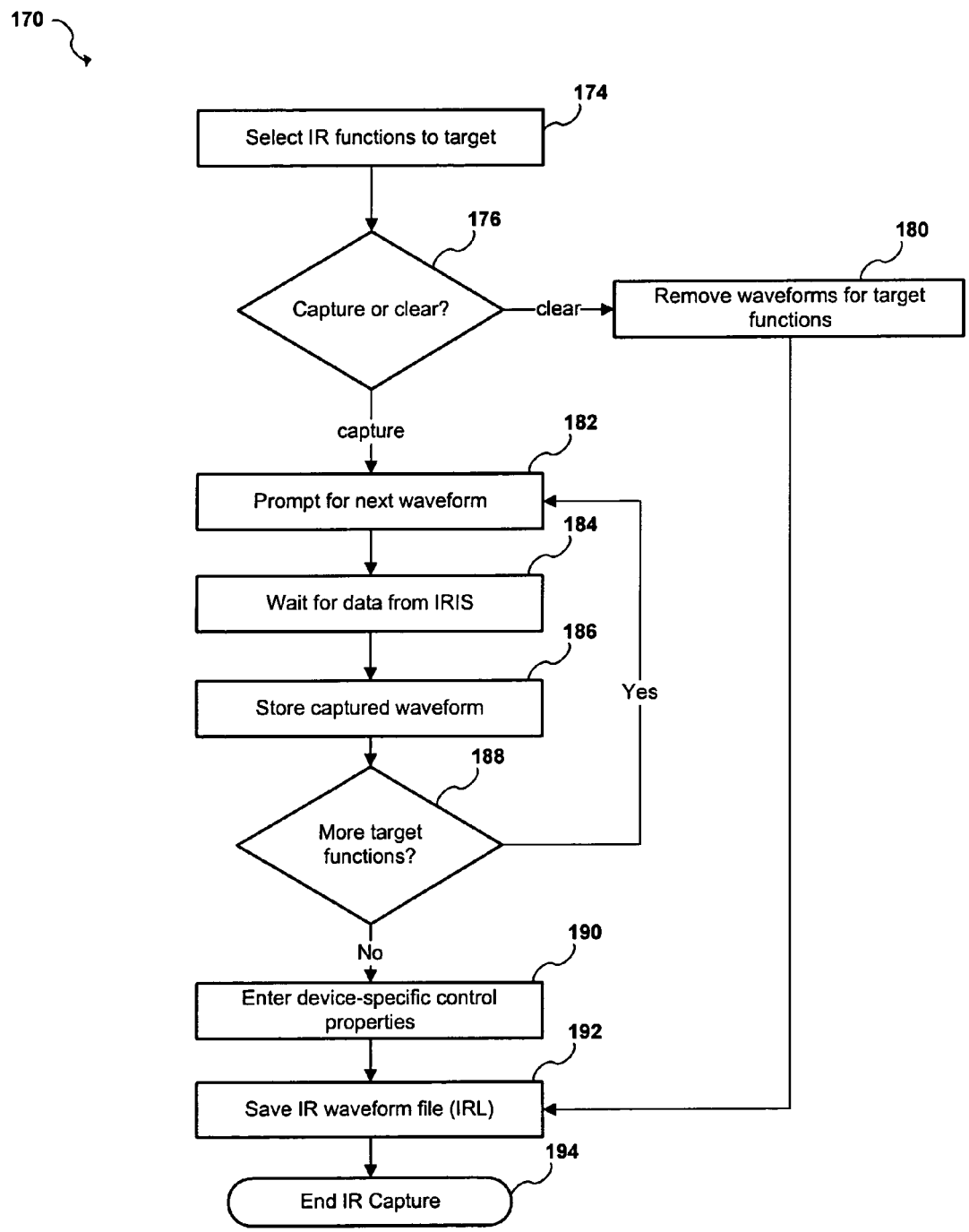

The capture of one or more IR waveforms of block 170 is shown in detail in FIG. 1D. At block 174, one or more IR functions to target are selected. At block 176, a determination is made as to whether the user desires to capture or clear an IR waveform. If the user desires to clear an IR waveform, then the waveform is removed, at block 180. Otherwise, the user is prompted to enter a waveform, at block 182. The configuration computer program waits for a new waveform and then stores the captured waveform, respectively, at blocks 184 and 186. This repeats until all of the target function have been captured, at block 188. Optionally, at block 190, the user may be prompted to enter device-specific control properties. At block 192, the IR waveform is saved to disk or other storage or network device.

During the capture of device IR codes, the configuration computer program may be configured to allow the user to specify a list of codes to be captured. An assistant may then be used to guide the user through the capture of the device IR codes with minimal or no additional input from the user.

Figure 14:
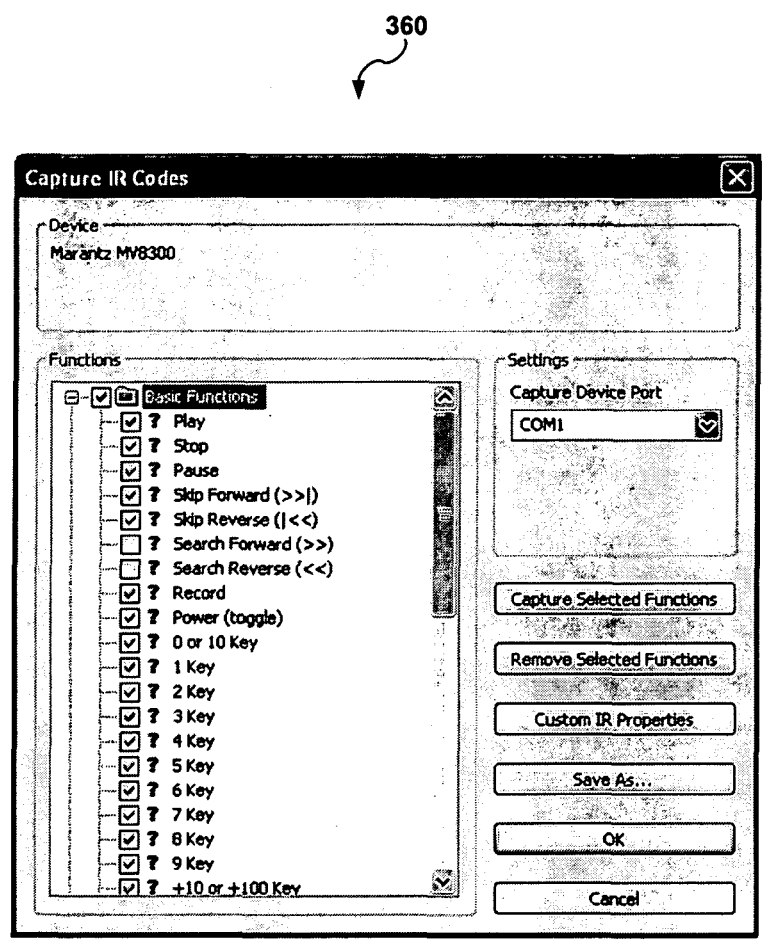
Figure 15:
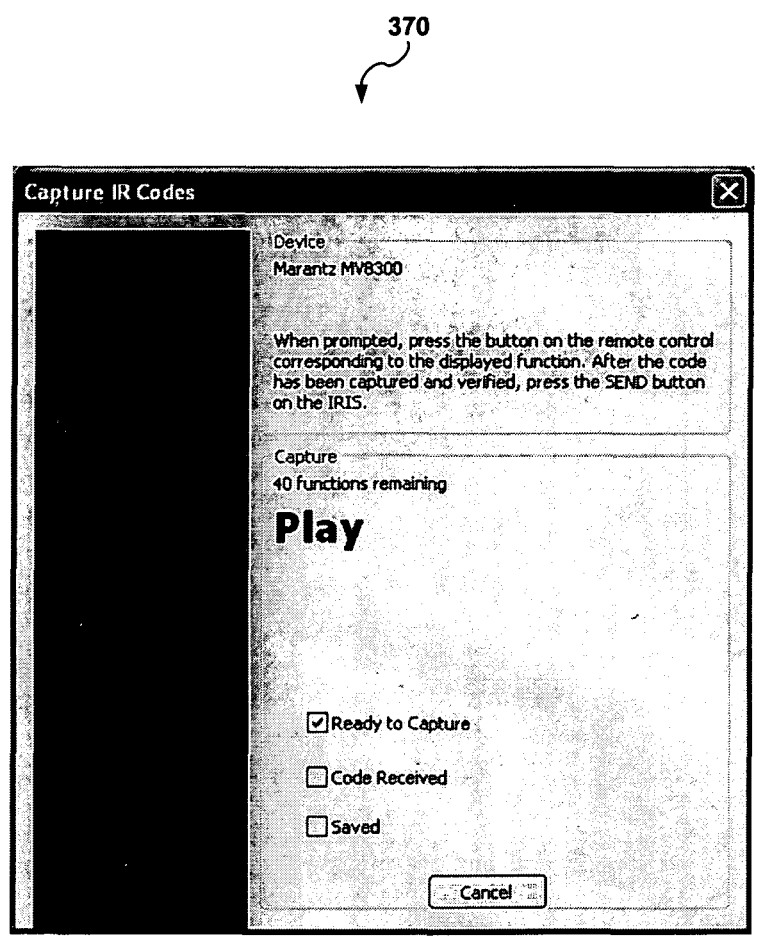
Figure 16:
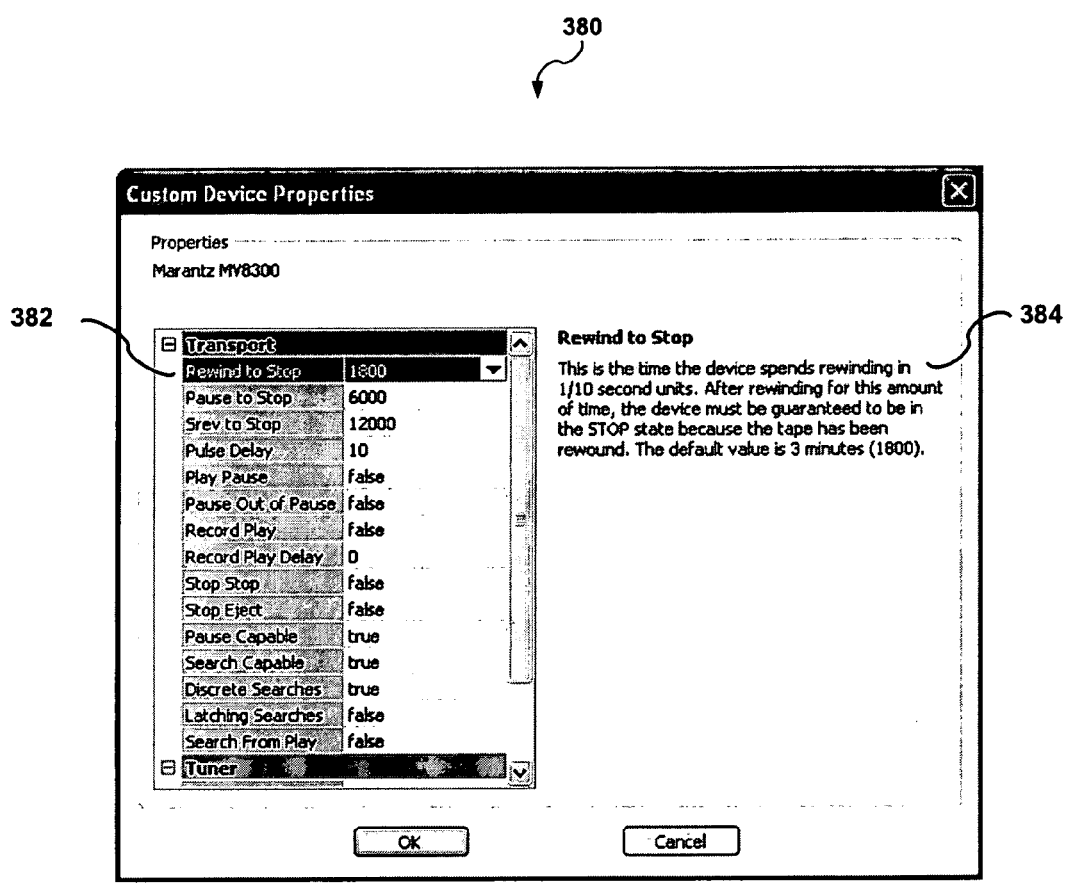

One possible non-limiting example of capturing of one or more IR waveforms is illustrated in FIG. 14-16. As shown in FIG. 14, a capture IR codes dialog 360 is presented to allow the user to select one or more functions to be captured. Upon selecting the "Capture Selected Functions" button, the waits to receive one or more IR waveforms, as shown in FIG. 15. The user may also customize IR properties, as shown in FIG. 16.

II. Code Description

At block 196, a determination is made as to whether an automation beyond a simple control is required. If there is such a requirement, then an automation script may be developed using a conventional means, such as a codebuilder, at block 200.

In one embodiment, device controls may be customized using metadata or similar means. In this configuration, the user may specify the behavior of a device in a simply way using metadata. The configuration computer program may be configured to present the user with the list of all applicable metadata that is available. The user can then customize the values as needed for each device.

The configuration computer program may be configured to automatically add basic device control programming and to connect the user interfaces to any device, including AMX and third party devices. If additional programming is necessary for a user interface, then the user may add to or customize existing programming by selecting functions from the devices in the system and customizing each function through its available parameters. Programming elements such as waits and if-else-end if blocks allow the user to build complex automation scripts.

A codebuilder may be used to program all available events for a selected device. From the system view, the available events represents one or more of the supported functions for a specific device. The available event may be organized as basic, advanced and custom functions. From the touch panel or keypad views, the available events represent those events accessible from that specific user interface device. All views for a given device may be configured to share programming information. For example, if the user invoked codebuilder with a DVD device selected from a touch panel view and programmed a macro for the Play event, the configuration computer program may also program the Play event for a keypad in the system.

For each event, a default handler may be pre-populated with a call to an appropriate module function. Under most circumstances, this will be the Push handler. If desired, the user may also create or remove Release and Hold handlers for an event, as long as one handler exists for the event. The defined handlers may be configured to not be represented in the list of available events, but instead be represented in the main handler definition area. Any events that have been modified by the user may be denoted as such visually in the events list.

To build the steps in an event handler, codebuilder may be configured to provide a toolbox with General, Action, and Status items. General items may include, but are not limited to, IF-ELSE and WAIT constructs. Generally, there will be no looping constructs. However, such looping construct may be made available without departing from the present invention. The Action items represent the available functions for the devices currently in the system that perform an action. The Action items may be organized by device, and then by basic and advanced. The Status items may be organized by device, and then by basic and advanced for available functions for the devices currently in the system that do not perform an action, but return status information about the device for the purpose of creating conditionals. Both the Action and Status items may also be configured to be filtered to only show functions available for the device currently being programmed instead of all devices currently in the system.

From the toolbox, items may be added to the handler definition by drag-and-drop, by double-click or by menu items. Drag-and-drop operations allow the item to be placed wherever desired within the currently defined steps, and the insertion point of the item may be visually represented. If an item in the toolbox is double-clicked, it may be added to the end of the steps in the current handler. Optionally, a menu item may exist to allow a selected item to be added to the end, and one to allow a selected item to be inserted before the currently selected handler step. General and Action items may be added or inserted anywhere in the handler steps. IF-ELSE items may be nested to a predetermined number of levels. Status items may either be dropped onto an existing IF-ELSE construct, or added as a new step. If dropped onto an IF-ELSE, the status will be added to the current chain of status items in the IF. A predetermined number of status items may be combined into a single IF statement. If added as a new step, the Status item will automatically be put into an IF-ELSE construct. In one embodiment, IF-ELSE items may be nested five (5) levels deep, and up to five (5) status items may be combined into a single IF statement.

Once added to the handler definition, one or more steps may be selected to be moved, removed, or copied. If either the IF, ELSE, or ENDIF items of an IF-ELSE construct are selected, the entire construct, with all contained steps, may also be selected. Move operations may be configured to only be allowed if a single step or multiple contiguous steps have been selected. Paste operations may be configured to only be allowed if either no steps or a single step is selected. Having no steps selected will add the copied steps to the end, and having a single step selected will insert the copied steps before the selected step. Parameter or IF-ELSE conjunction editing may be configured to only be allowed if a single step or IF-ELSE construct is selected. For IF-ELSE constructs, the user may define the main IF as either IF or IF NOT. For additional status items in an IF, the user may define the conjunction as AND, AND NOT, OR, or OR NOT.

In one embodiment, the undo/redo operation may be configured to be available from within codebuilder for the following actions: add/remove event handler, add/insert handler step, move handler step, remove handler step, and edit handler step. These actions may be undone individually for the duration of the current codebuilder session. The user may discard or commit any changes made. If the changes are committed, they may be configured to become available as a single action in the main application undo/redo stack. Whether committed or discarded, the actions in the codebuilder undo/redo stack may be cleared upon the termination of codebuilder and not be available the next time codebuilder is invoked.

Because the steps for any given event handler may contain calls to functions across multiple devices, configuration computer program may be configured to not provide means to copy or export device and/or programming information such that it can be pasted or imported into another project.

Figure 1E:
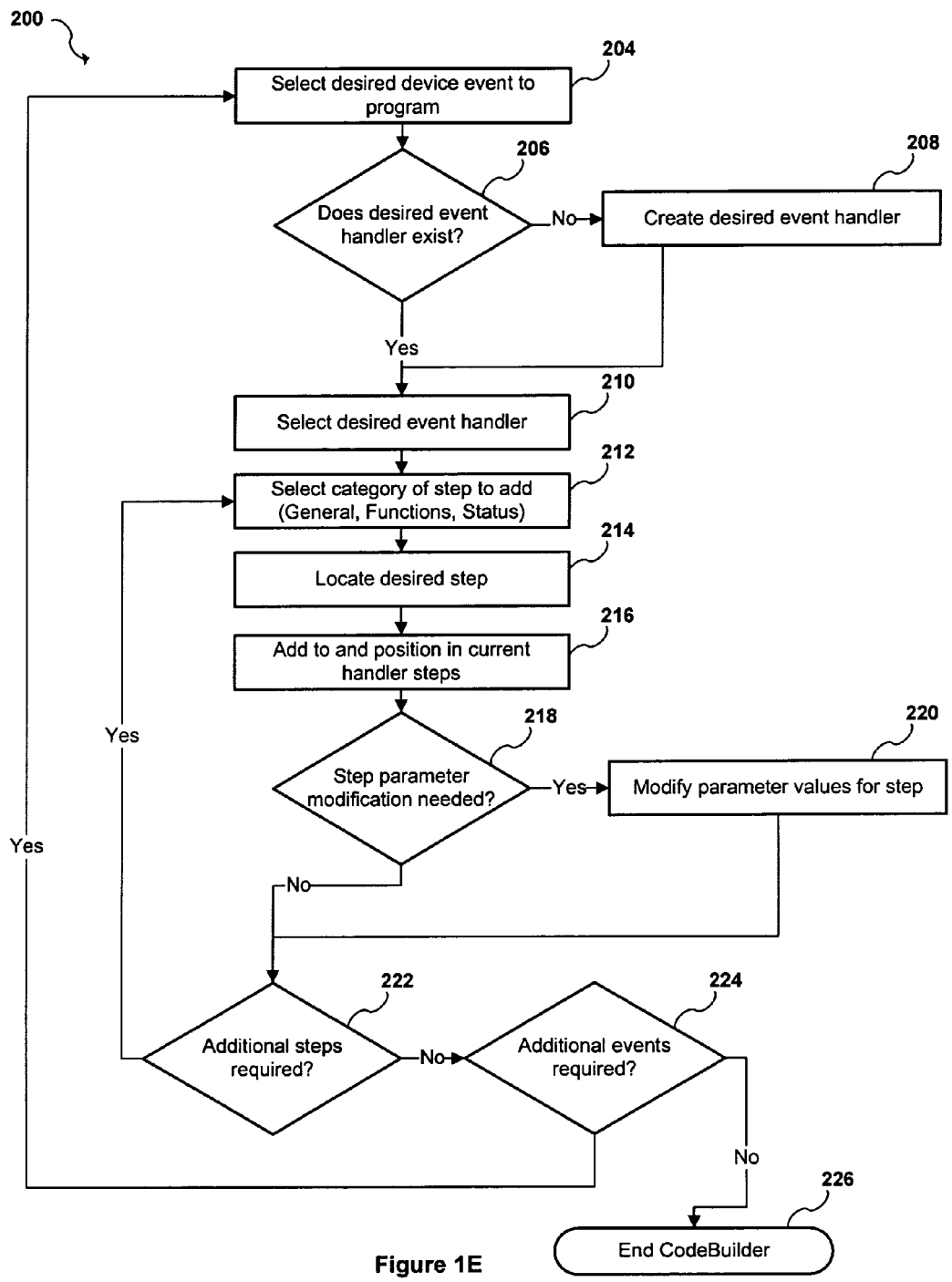
Figure 17:
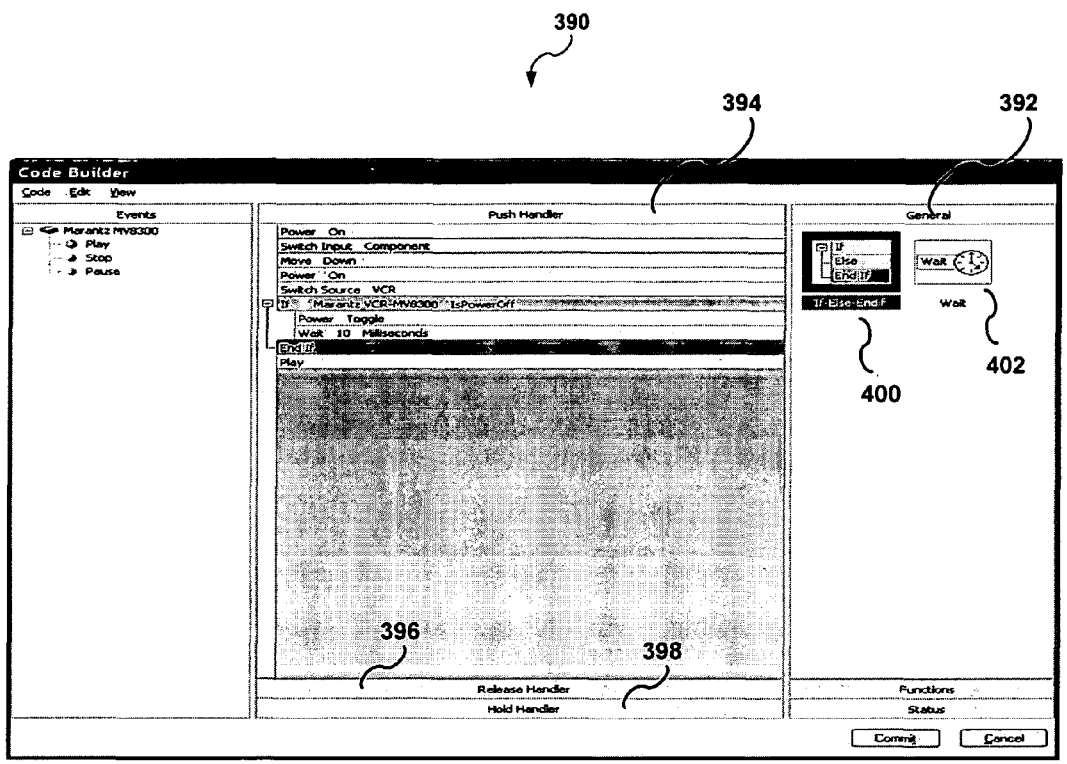
Figure 18:
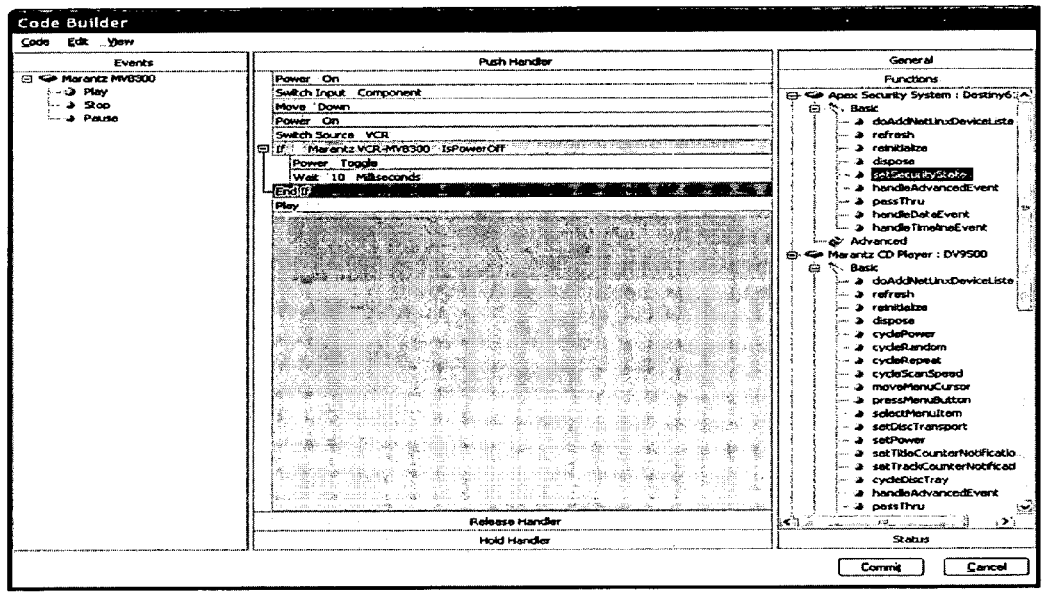
Figure 19:
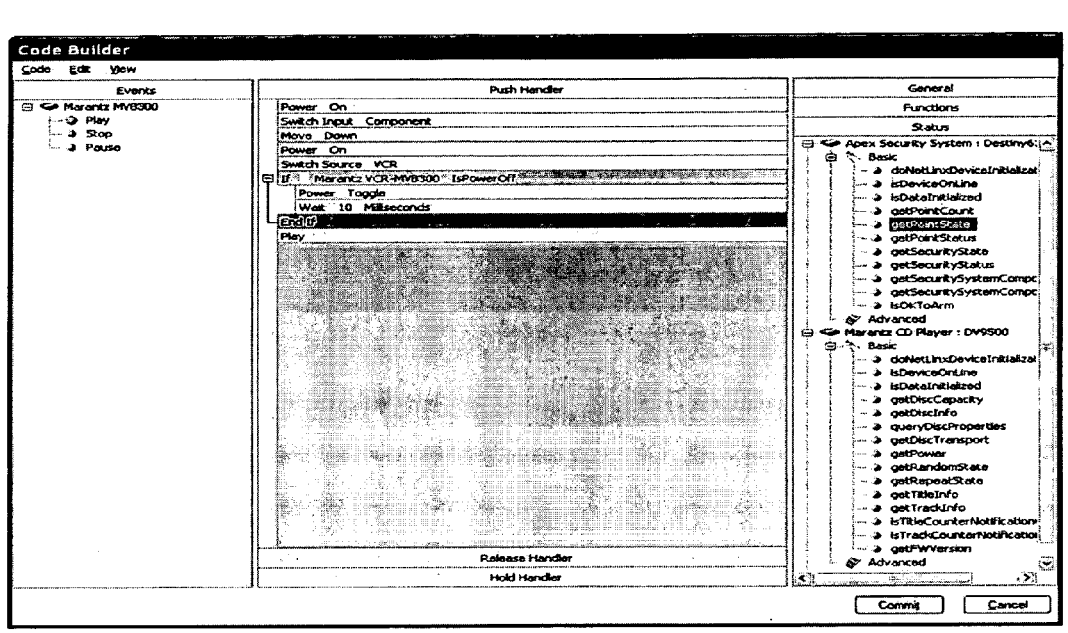

An automation script is shown in detail in FIG. 1E. At block 204, a desired device event to be programmed is selected. At block 206, a determination is made as to whether a handler for the desired event exists. If the desired event handler does not exist, then the event handler may be created at block 208. If the desired event handler does exist, then the event handler is selected, at block 210. The category of a step or operation to add is selected at block 212. Step or operations include, but are not limited to, general, function and status. At blocks 214 and 216, the desired step or operation is located and added to an appropriate position within the handler. Adding the desired step or operation may be accomplished by any number of means including, but not limited to, double clicking an icon or dragging-and-dropping an icon representing the desired step or operation. At block 218, a determination is made as to whether a step or operation parameter needs to be modified. If the step or operation parameter needs to be modified, then the user may modify the parameter values for that step or operation, at block 220. The process continues until all of the desired steps and events have been added, as shown at blocks 222 and 224. One possible non-limiting example of an automation script is illustrated in FIG. 17-19. As shown in FIG. 17, one or more handlers (e.g., Push Handler, Release Handler, and Hold Handler) may be configured using a code builder 390. A user may select general IF-ELSE-ENDIF 400 or WAIT 402 from toolbar 292. Functions and Status steps or operations may also be selected, as shown in FIGS. 18 and 19.

III. User Interface Description

At block 228, the user interface navigation that is desired may be established for any keypads and touch panel devices as they relate to respective devices and their supported functionality. The configuration program may be configured to automatically generate the user interface elements to control a device based on the available functions for the device. The configuration computer program allows the user to customize the control of a device by adding and removing user interface elements, including but not limited to menus, second-tier sub-menus, buttons, place holders and other predetermined or prepackaged features. Prepackaged features include, but are not limited to, Internet web pages, weather information, and electronic surveillance and security. The configuration program may be configured to graphically represent user interface elements and their respective relationship to physical or virtual device displays (e.g., the display of a VCR device may include play, record, stop, rewind and forward buttons).

Figure 20:
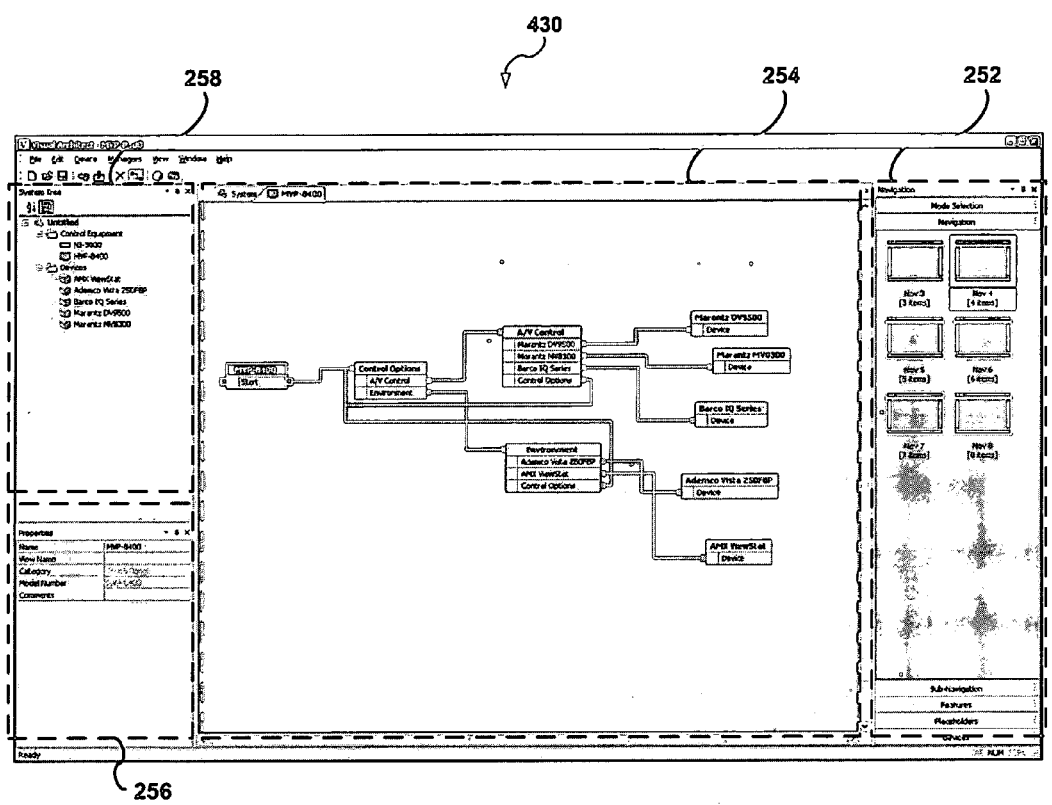

One possible non-limiting example of establishing user interface navigation for keypads and touch panel devices is illustrated in FIG. 20. A user may be presented with an user interface navigation screen 430 having a toolbar 252 that includes navigational categories represented as tabbed view areas. As shown in FIG. 20, the user has selected a navigational categories of "Navigation" from the toolbar 252 which is represented by one or more visual icons each representing navigation menus of different configurations for a respective keypad or touch panel device.

IV. Project Generation

Figure 22:
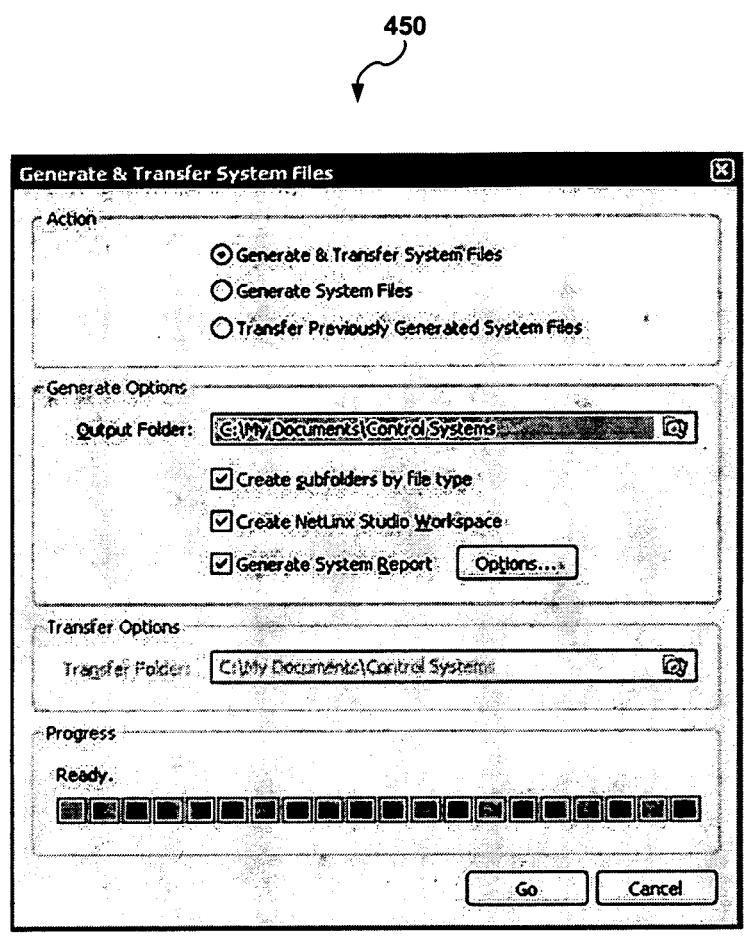

At block 230, the configuration computer program generates one or more project files based upon the completed design. These project files may include programming and user interface. The configuration computer program may optionally offer the user the option to download these files to the control system, its peripherals and/or system devices. One possible non-limiting example of generating and transferring system files is shown in FIG. 22.

Figure 21:
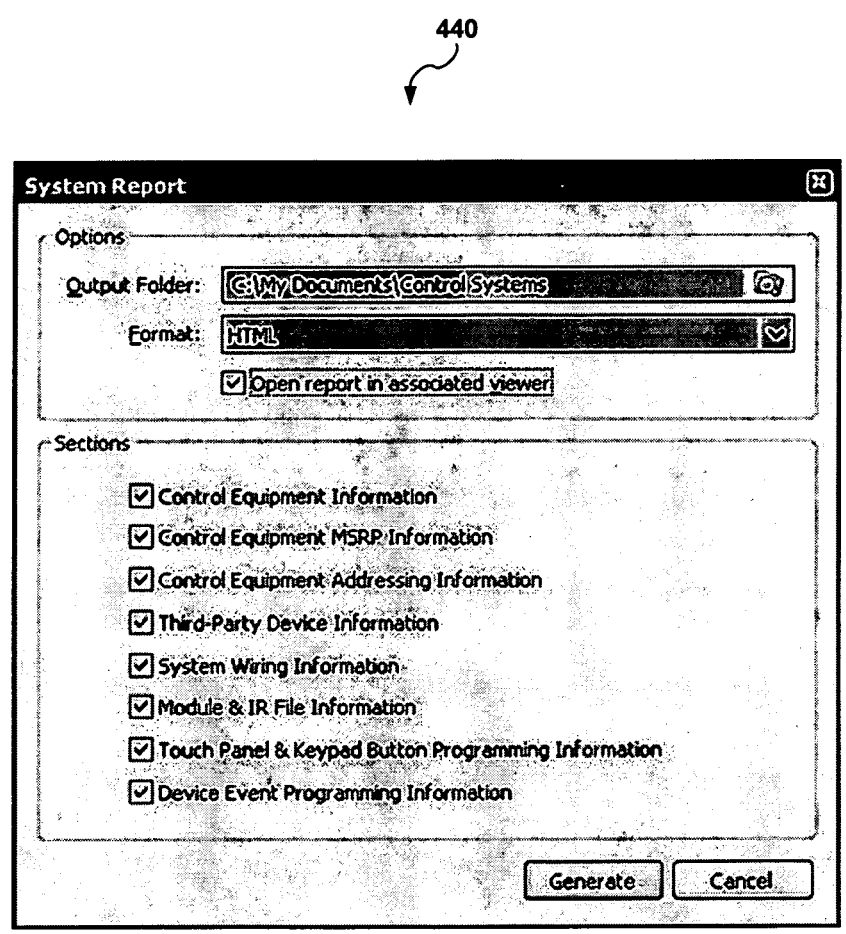

Optionally, the configuration computer program may generate a system report that represents the completed design, at block 232. The system report may include, but is not limited to, control equipment information, control MSRP information, control equipment and addressing information, third party device information, system wiring information, module and IR file information, touch panel and keypad button programming information and device event programming information. The system report may be generated manually or part of an automated process. The system report may be output to a disk or other storage device locally or remotely over a network or a printer. The system report may be output in numerous output formats including, but not limited to, HTML, XML, ASCII text or PDF formats. One possible non-limiting example of selecting the options available for a system report is shown in FIG. 21.

Once the project has been created, the project information may be saved in a file, such as a File-System-In-A-File ("FSF") file, as discussed below. Thereby, multiple project files and possibly hundreds of files may be stored in a single file to ease file management and the transport of the project from one computer to another. However, the project information is not required to be stored in a single file and may be transferred by any other similar means. For instance, the project information may be stored in multiple files or, instead, directly transferred over a network without storing the project information in a disk file at all.

V. Project Transfer

At block 234, a determination is made as to whether a transfer of project files to relevant devices is desired at this time. If such a transfer is desired by the user, then at block 236 the one or more project files are transferred to such devices. The user may select from several options including, generating and transferring system files, generating system files, or transferring previously generated system files. The project development ends at block 238. As previously noted, one possible non-limiting example of generating and transferring system files is shown in FIG. 22.

VI. The Configuration Process

Figure 6:
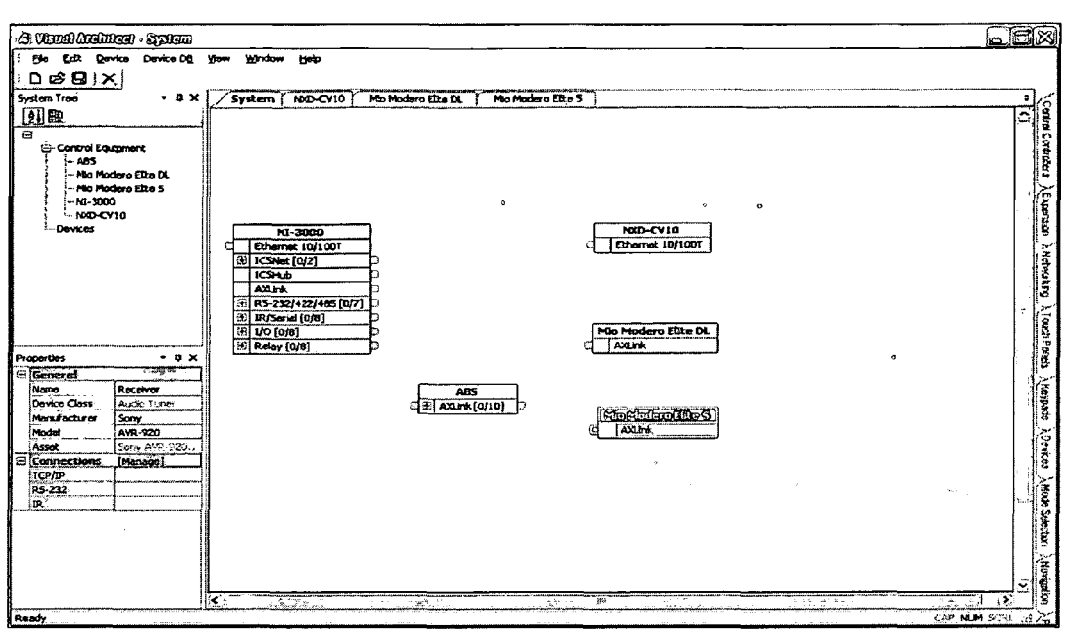
Figure 7:
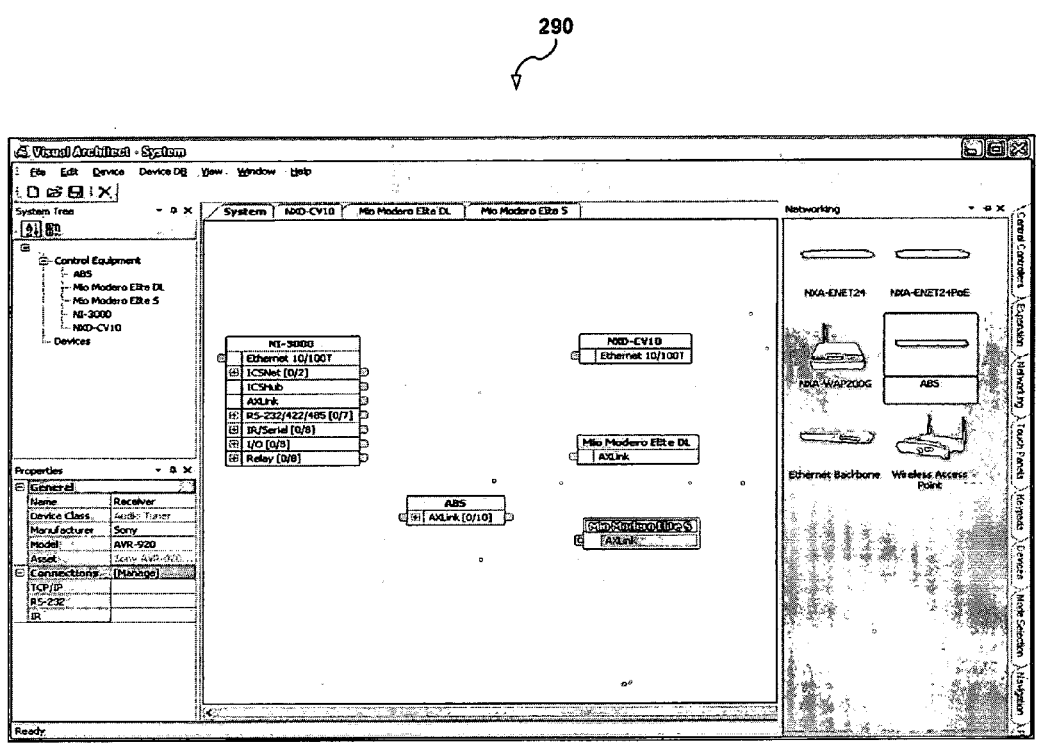
Figure 8:
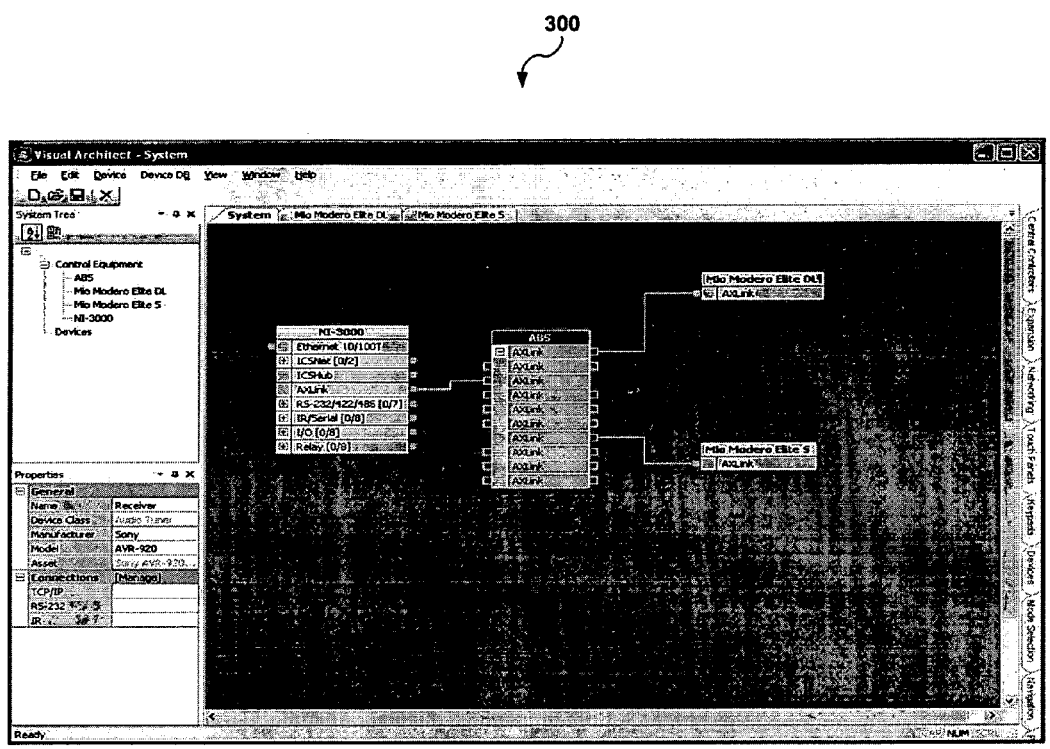
Figure 9:
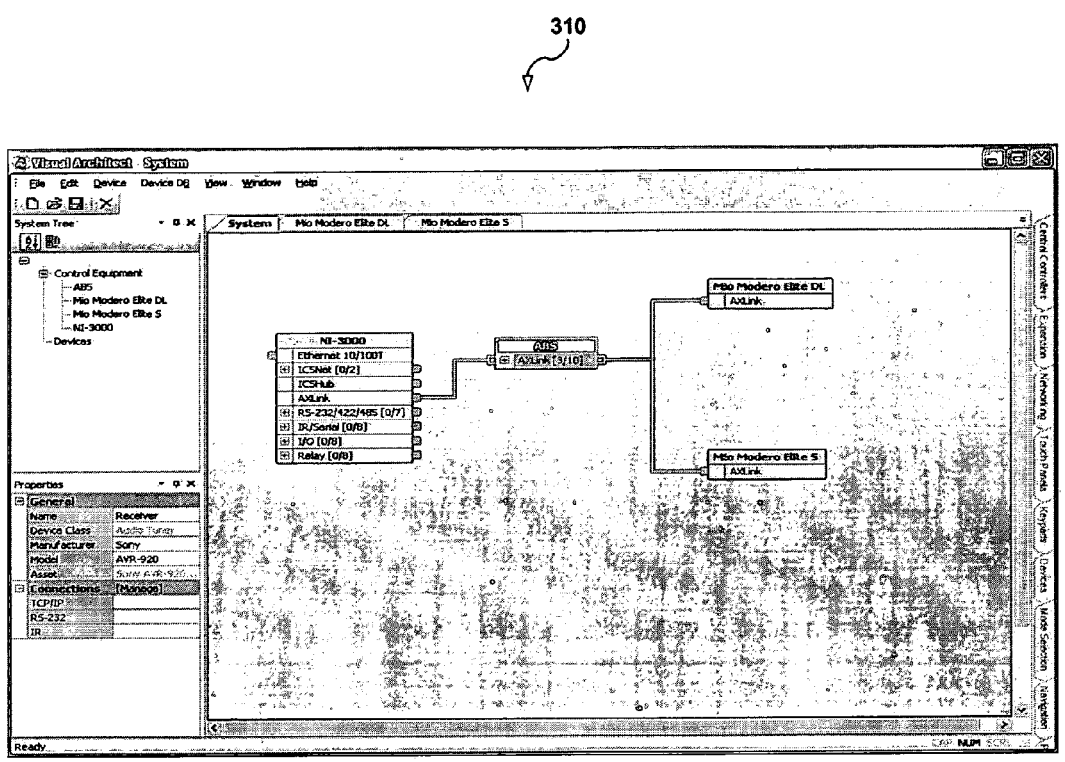
Figure 11:
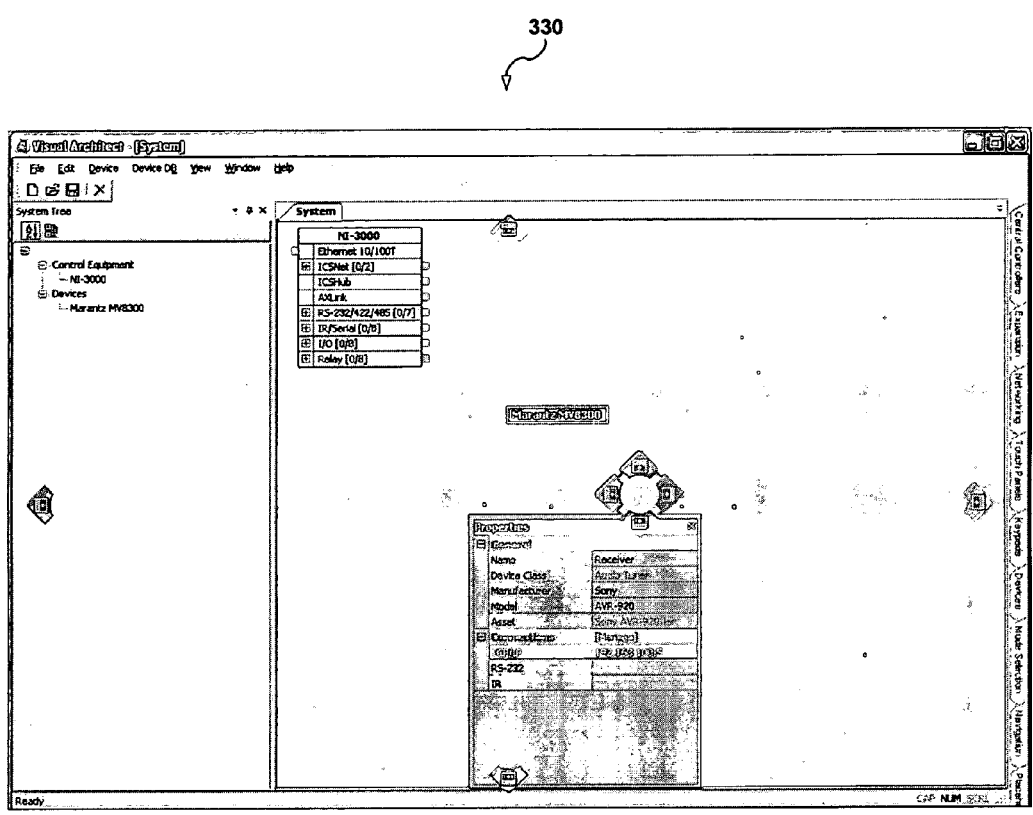
Figure 12:
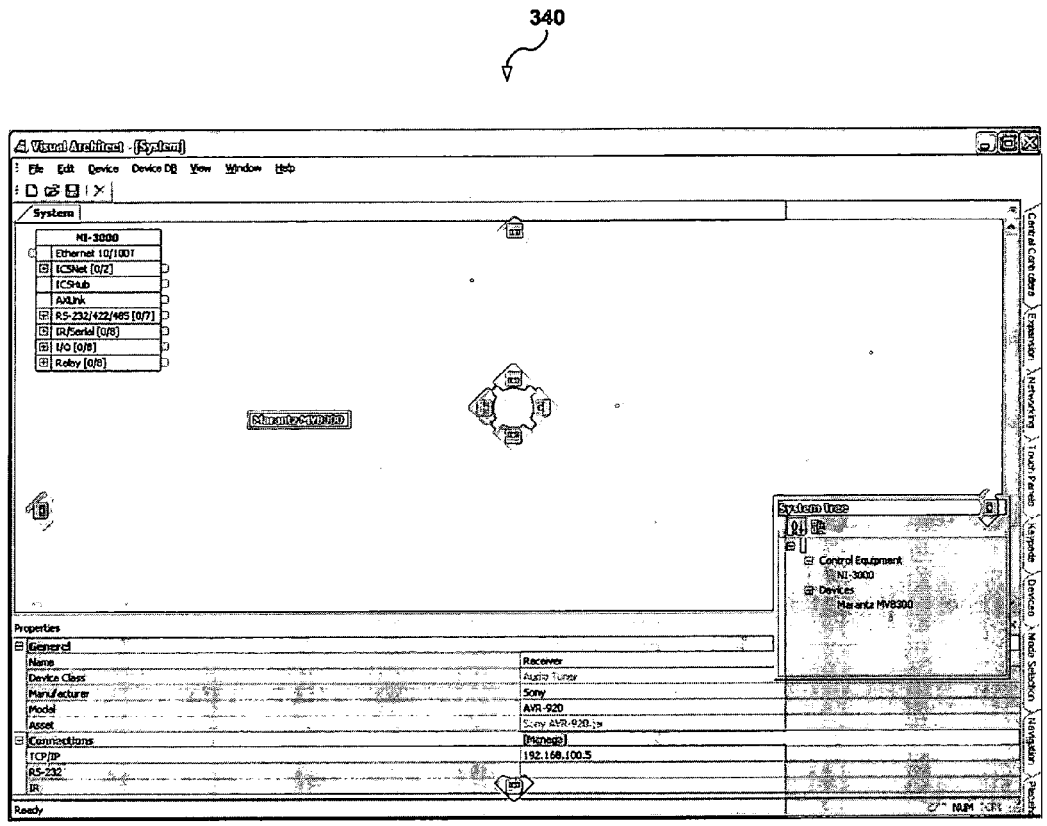
Figure 13:
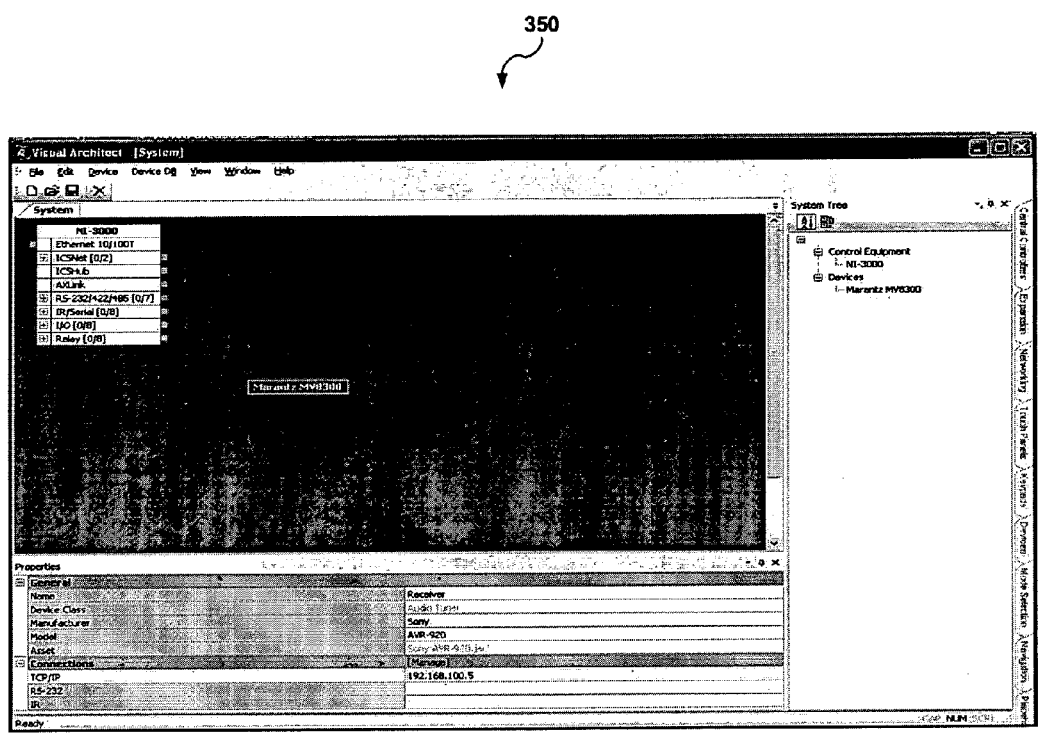

Referring to FIGS. 3-22, possible non-limiting examples of the configuration computer program are shown. An initial screen 250 of the configuration computer program according to the present invention is shown in FIG. 3A. The initial screen 250 displays a list of central controllers and methods to either start a new system, or to open an existing system. The basic system assistant dialog 260 provides a method to get the project started, as shown in FIG. 4. Graphical device selection dialogs 270 present the user with ease of selection, as shown in FIG. 5. As shown in FIG. 6, a user may collapse one or more toolboxes on the screen into tabs that open when the mouse hovers over them. Thus, an open palette area is presented to the user. The user may use this open palette are to design the system. For instance, a mouse hovering over the networking tab is shown in FIG. 7. Devices such as the ABS and master controllers can be expanded so that specific port connection can be establish, as shown in FIG. 8. A user may collapse the device to reclaim portions of the screen for further screen design, as shown in FIG. 9. A properties control window 320 allows the user to quickly edit and view device properties, as shown in FIG. 10. As shown in FIG. 11, one or more controls may be custom positioned within the viewing area by dragging a control by its title bar. The result of docking the properties of a control is shown in FIG. 12. FIG. 13 shows the new positions for the control window. As shown in FIG. 14, a user may bring up an IR capture menu. For instance, the user may bring up a right click menu by right clicking on one or more IR controlled devices. As shown in FIG. 15, a user may optionally bring up a top menu selection. A simple, intuitive assistant may be used to guide the user through the capture process one button at a time. One or more custom device properties 382 for a device may also be edited and used to assist the user in establishing device specific behaviors within a class of device, as shown in FIG. 16. For instance, a VCR's Rewind to Stop time may be set to 1800 seconds or 3 minutes. Each item may be configured to include a descriptive text area 384, also known as the property documentation, that may be used to provide necessary documentation for setting each item. The descriptive text area 384 may be used to ease the workflow by overcoming the requirement of examining a paper manual or opening a help window.

As shown in FIG. 17, by selecting a codebuilder menu item, the user is able to develop automation code using high-level macro-like elements such as if-then-else statements and waits as displayed in the General tab 392 on the right. The user may utilize these elements by dragging them to the desired location in a selected Handler. For instance, as shown in FIG. 17, the Push Handler 394 action may be configured such that a particular action is taken when a button is pushed. For example, FIG. 17 shows that if statement 400 and wait 402 actions are taken when the button is pushed. Other handlers may also be configured. For instance, Release Handler 396 and Hold Handler 398 actions may be configured such that particular actions are taken when a button is respectively released and held.

As shown in FIG. 18, the items available on a Functions tab provides the user with a full range of capabilities for each device within the system. For example, as shown in FIG. 18, the user may develop a Push Handler for a VCR and set the state of a security system when the button is pushed. For instance, enabling the alarm while watching a movie. A variety of functions may be displayed on this screen including, but not limited to, Power, Move, Switch and Source.

As shown in FIG. 19, the Status tab may allow a user to query the device status from any device within the system, such that the appropriate conditional logic may be created.

As shown in FIG. 20, a user interface navigation for keypads and touch panel devices may be established using a drag-and-drop graphical user interface. A user may be presented with an user interface navigation screen 430 having a toolbar 252 that includes navigational categories represented as tabbed view areas.

As shown in FIGS. 21 and 22, the user may be respectively prompted to manually configure and generate a system report, and to generate and transfer system files.

The project files created and used by the application may be stored in a proprietary FSF format. The FSF format eases file maintenance for the numerous files that may be required for a system. Prior to inclusion in the FSF file format, XML-based files may be compressed for size and security purposes. One exemplary configuration for an XML file used for a Touch Panel design is shown in FIG. 20.

VII. The FSF Format

According to the present invention, project information or other useful information may be saved in a File-System-In-A-File ("FSF") file. FSF is a general use file format that is used for archiving or combining multiple files, of any size and/or type, into a single FSF file. The FSF format allows adding, updating, extracting and removing of contained files more quickly than traditional techniques. The FSF format is well suited for embedded use by applications which would otherwise have to maintain project directories of multiple files. A FSF file maintains a map of free and used "blocks" similar to the method employed by a file system. As with a true file system, the FSF allows file data to not be stored non-contiguously, but sparely throughout the available space. Unused blocks may be efficiently removed at any time through a block packing and/or defragmenting algorithm.

A FSF file begins with a 12-byte header used to identify the file as an FSF file, and to indicate the block number of the first file entry block:

| FSF Header Definition | |
| --- | --- |
| BYTE[8] | abyFileID |
| DWORD | dwListStartBlock |

For instance, an FSF file may be identified with an file ID equal to NULL byte, followed by the string "FSFILE" and another NULL bytes. However, other arrangements may be used to identify the file as an FSF file.

The remainder of the file format is a collection of blocks of data that contain a predetermined number of bytes of data storage. For instance, each block may contain 512 bytes of data storage. The file format also includes the block number of the current, next, and previous blocks, if applicable, and the number of bytes of data actually stored in the block:

| FSF Block Definition | |
| --- | --- |
| DWORD | dwThisBlock |
| DWORD | dwPrevBlock |
| DWORD | dwNextBlock |
| USHORT | usBytesUsed |
| BYTE[512] | abyData |

A block may have many different forms including, but not limited to, a usage block, a file entry block, of a file data block. The different forms differ in the contents of the block data.

A usage block maintains the map of free and used blocks for a given range of blocks in the file. The bits of the bytes in the block data represent the usage for a block of data in the file.

For instance, a single usage block may track up to 4096 blocks (8 bits per byte×512 bytes). Block 0, the first block in the file may be configured as a usage block to track blocks 0 through 4095. If the file grows beyond 4096 blocks, a new usage block may be allocated at block 4096 to track blocks 4096 through 8191. In this way, usage blocks may be configured at multiples of 4096 (i.e., blocks 0, 4096, 8192, 12288, etc.) and the first bit of the first byte of every usage block's data may be set to indicate that the block is being used by itself:

| Usage Block Definition | | | | | | | |
| --- | --- | --- | --- | --- | --- | --- | --- |
| DWORD | | | | dwThisBlock | | | |
| DWORD | | | | dwPrevBlock | | | |
| DWORD | | | | dwNextBlock | | | |
| USHORT | | | | usBytesUsed | | | |
| BYTE[512] | | | | abyData | | | |
| 1 | 0 | 0 | 0 | 1 | 1 | 1 | 1 |
| 1 | 1 | 0 | 0 | 1 | 1 | 1 | 0 |
| | | | ... | | | | |
| 1 | 0 | 0 | 0 | 1 | 1 | 1 | 1 |
| 1 | 1 | 0 | 0 | 1 | 1 | 1 | 0 |

The previous and next block values indicate the previous and next usage blocks, if applicable. The bytes used value may be used to track the byte in which the first free block is located for speed in finding free blocks.

A file entry block identifies the beginning of a stored file and stores in the block data the file path, creation time, modification time, file system flags, the first block of the file, the size of the file in blocks, and the size of the file in bytes:

| Usage Block Definition | |
| --- | --- |
| DWORD | dwThisBlock |
| DWORD | dwPrevBlock |
| DWORD | dwNextBlock |
| USHORT | usBytesUsed |
| CHAR[260] | szFilePath |
| TIME_T | timeCreate |
| TIME_T | timeModify |
| DWORD | dwFlags |
| DWORD | dwStartBlock |
| DWORD | dwSizeBlocks |
| DWORD | dwSizeBytes |

The previous and next block values indicate the previous and next file entry blocks, if applicable. The bytes used value is optional and may be unused.

A file data block contains part of the actual data for a stored file. The previous and next block values indicate the previous and next file data blocks for the file, if applicable. The bytes used value indicates the number of bytes used of the available block data. Generally, the data blocks are configured to use the entirety of the available block data storage. However, the last data block for a file may have a bytes used value other than the other data blocks.

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A method for graphically configuring devices in a control area network, comprising:
    providing one or more application programming interfaces, wherein at least one of the application programming interfaces corresponds to a class of devices and comprises a set of functions, and each class of devices includes one or more devices;
    creating a plurality of graphical objects using a graphical user interface, wherein at least one of the graphical objects represents one or more of the devices, and another one of the graphical objects represents a control system;
    developing an automation script of at least one of the graphical objects, said automation script operable to configure one or more event handlers for one or more of the devices;
    creating conditional logic for the one or more devices based on the functions; and
    associating the conditional logic and one or more of the functions of at least one of the application programming interfaces with one or more of the devices using the graphical user interface, wherein
    the developing of the automation script further comprises using at least one of the graphical objects to configure one or more of the event handlers for one or more of the devices, and
    adding items to the handler definition by drag-and-drop, double-click, or menu items.

2. The method of claim 1, further comprising associating one or more devices with one or more of the control systems.

3. The method of claim 2, further comprising automatically generating one or more of the graphical objects for at least one of the devices.

4. The method of claim 3, wherein one or more of the functions are automatically associated.

5. The method of claim 2, wherein creating the graphical objects is customizable.

6. The method of claim 2, wherein at least one of the graphical objects is used to create other graphical objects.

7. The method of claim 2, wherein at least one of the graphical objects is used to associate one or more of the functions.

8. The method of claim 2, further comprising generating a report representing a configuration of one or more of the devices.

9. The method of claim 8, wherein an output format of the report is selected from the group consisting of HTML, XML, ASCII text and PDF.

10. The method of claim 2, further comprising displaying properties of one or more of the devices on the graphical user interface.

11. The method of claim 2, further comprising configuring the one or more of the graphical objects using metadata.

12. The method of claim 2, further comprising generating device control programming for one or more of the devices.

13. The method of claim 12, wherein the device control programming is automatically generated.

14. The method of claim 12, wherein the device control programming is customizable.

15. The method of claim 14, wherein the device control programming is customized using a code builder.

16. The method of claim 12, wherein at least one of the graphical objects is used to generate the device control programming.

17. The method of claim 12, wherein one or more drag-and-drop operations on the graphical user interface is used to generate the device control programming.

18. The method of claim 2, further comprising:
generating configuration data for at least one of the associated devices based on the associated functions; and
transmitting the configuration data across the control area network.

19. The method of claim 18, wherein the configuration data comprises XML data.

20. The method of claim 18, wherein the configuration data comprises IR waveforms.

21. The method of claim 18, wherein the configuration data comprises touch panel configuration data.

22. The method of claim 18, wherein the configuration data comprises keypad configuration data.

23. The method of claim 18, wherein the control area network comprises a master controller, and the configuration data is transmitted to the master controller.

24. The method of claim 18, wherein one or more of the devices comprise physical devices.

25. The method of claim 24, wherein the control area network comprises one or more of the physical devices, and the configuration data is transmitted to at least one of the physical devices.

26. The method of claim 2, wherein one or more of the devices comprise physical devices.

27. The method of claim 26, further comprising capturing an IR waveform of at least one of the physical devices.

28. The method of claim 26, wherein the physical devices of each class of devices have at least one of a common operation and a common functionality.

29. The method of claim 26, wherein the control area network comprises one or more of the physical devices.

30. The method of claim 26, further comprising detecting the addition of a physical device to the control area network.

31. The method of claim 30, wherein one or more of the functions are automatically associated upon the physical device detection.

32. The method of claim 30, wherein one or more of the graphical objects are automatically created upon the physical device detection.

33. The method of claim 30, further comprising automatically generating device control programming for one or more of the devices.

34. The method of claim 26, wherein one or more of the physical devices utilize proprietary protocols.

35. The method of claim 32, further comprising abstracting the proprietary protocols of the physical devices from application programming interfaces using the associated functions.

36. The method of claim 26, wherein the control area network comprises a master controller and one or more of the physical devices.

37. The method of claim 36, further comprising connecting one or more of the physical devices to the master controller using the graphical user interface.

38. The method of claim 37, wherein the physical devices are automatically connected to the master controller.

39. The method of claim 36, wherein the physical devices are automatically associated using a best-fit algorithm.

40. The method of claim 39, wherein the best-fit algorithm utilizes respective input and output connection types of the physical devices.

41. The method of claim 26, wherein at least one of the application programming interfaces comprises an object-oriented application programming interface.

42. The method of claim 26, further comprising communicating between the physical devices and the respective application programming interfaces using one or more of said event handlers.

43. The method of claim 26, wherein at least one of the physical devices has different characteristics than one or more of the other physical devices.

44. The method of claim 43, wherein the different characteristics is selected from the group consisting of a different operation and a different functionality.

45. The method of claim 2, wherein at least one class of devices comprises one or more brands of home entertainment devices.

46. The method of claim 45, wherein the home entertainment devices are selected from the group consisting of A/V receivers, monitors, video projectors, televisions, digital satellite systems (DSS), set top boxes, disk devices, DVR/PVRs, digital media players, digital media servers, DVD players, VCRs, DVRs, VCR/DVD combination players, video conferencers, audio conferencers, audio tuners, cassette decks, level controllers, pre-amplifiers, audio processors, cameras, lights, cable receivers, and satellite receivers.

47. The method of claim 2, wherein at least one class of devices comprises one or more brands of security equipment.

48. The method of claim 47, wherein the security equipment is selected from the group consisting of cameras, sensors, alarms and motion detectors.

49. The method of claim 2, wherein at least one class of devices comprises one or more brands of environmental control equipment.

50. The method of claim 49, wherein the environmental control equipment is selected from the group consisting of heating units and air conditioning units.

51. The method of claim 2, wherein at least one class of devices comprises one or more brands of household appliances.

52. The method of claim 1, wherein at least one class of devices comprises a plurality of subclasses, and each subclass includes one or more physical devices.

53. The method of claim 52, wherein the physical devices of each subclass have a common attribute selected from the group consisting of a common operation and a common functionality.

54. The method of claim 1, wherein one or more of the functions are associated using a device database.

55. The method of claim 54, wherein the device database comprises available functions for one or more of the devices.

56. The method of claim 54, wherein the device database is organized by device class for one or more of the devices.

57. The method of claim 56, wherein the device classes are selected from the group consisting of a central controller, an expansion module, an expansion card, a networking device, a touch panel and a keypad.

58. The method of claim 56, wherein the device classes are selected from the group consisting of an audio conference, an audio processor, an audio tape, an audio tape, an audio tuner, a camera, a CD-ROM, a computer control, a digital media player, a digital media server, a document camera, a DSS, a DVD, a DVR, a HVAC, a lighting device, a monitor, a motor, a picture frame, a pool, a pre-an amp, a surround processor, a receiver, security, a set top box, a slide projector, a spa, a switcher, a TV, a VCR, a video conference, a video processor, a video projector, a volume controller and a weather device.

59. The method of claim 54, wherein the device database is organized by model number for one or more of the devices.

60. The method of claim 54, wherein the device database comprises fields selected from the group consisting of available connectivity options, control modules and events for one or more of the devices.

61. The method of claim 60, wherein the connectivity options are selected from the group consisting of a TCP/IP network, an ICSNet network, an AXLink network, a serial interface, an IR interface, an I/O interface, a relay interface, AMX card interface, an audio interface, a video interface and a power interface.

62. The method of claim 54, further comprising generating the device database by scanning one or more file directories on a computer for files selected from the group consisting of Duet modules and IR files.

63. The method of claim 62, wherein the file directories comprise predefined standard file directory path locations.

64. The method of claim 62, wherein the file directories comprise file directory path locations manually entered by a user.

65. The method of claim 54, wherein the device database is automatically generated.

66. The method of claim 54, wherein the device database is generated by an operation of a user.

67. The method of claim 54, wherein the device database is automatically updated.

68. The method of claim 67, further comprising updating the database upon the detection of an additional physical device in the control area network.

69. The method of claim 54, wherein the device database is updated by an operation of a user.

70. The method of claim 54, further comprising verifying one or more of the devices.

71. The method of claim 70, wherein the verification comprises determining whether any of the devices do not have a corresponding entry in the device database.

72. The method of claim 54, wherein at least one of the functions is associated without using the device database.

73. The method of claim 54, wherein the device database is implemented using XML.

74. The method of claim 54, wherein the device database is distributed across one or more of the devices.

75. The method of claim 1, wherein one or more of the devices comprise virtual devices, and the virtual devices of each class of devices have a common attribute selected from the group consisting of a common operation and a common functionality.

76. The method of claim 75, wherein at least one virtual device comprises a plurality of physical devices.

77. The method of claim 76, wherein at least one virtual device comprises a home entertainment system.

78. The method of claim 77, wherein the home entertainment system is selected from the group consisting of A/V receivers, monitors, video projectors, televisions, digital satellite systems (DSS), set top boxes, disk devices, DVR/PVRs, digital media players, digital media servers, DVD players, VCRs, DVRs, VCR/DVD combination players, video conferencers, audio conferencers, audio tuners, cassette decks, level controllers, pre-amplifiers, audio processors, cameras, lights, cable receivers, and satellite receivers.

79. The method of claim 1, wherein one or more of the devices comprise logical devices.

80. The method of claim 79, wherein at least one logical device comprises a control system.

81. The method of claim 1, further comprising:
selecting one or more steps to be moved, removed, or copied once added to the event handler definition.

82. A computer product comprising a non-transitory computer readable medium embodying a computer program for graphically configuring devices in a control area network, the computer product comprising:
a first computer code for providing one or more application programming interfaces, wherein at least one of the application programming interfaces corresponds to a class of devices and comprises a set of functions, and each class of devices includes one or more devices;
a second computer code for creating a plurality of graphical objects using a graphical user interface, wherein at least one of the graphical objects represents one or more of the devices, and another one of the graphical objects represents a control system;
a third computer code for generating an automation script of at least one of the graphical objects, said automation script operable to configure one or more event handlers for one or more of the devices, said automation script including conditional logic for the one or more of the devices based on the functions; and
a fourth computer code for associating one or more of the functions of at least one of the application programming interfaces with one or more of the devices using the graphical user interface, wherein
the developing of the automation script further comprises using at least one of the graphical objects to configure one or more of the event handlers for one or more of the devices and determining whether a desired event handler exists.

83. The computer program of claim 82, further comprising a fifth computer code for associating one or more devices with one or more of the control systems.

84. The computer program of claim 83, further comprising a sixth computer code for automatically generating one or more of the graphical objects for at least one of the devices.

85. The computer program of claim 84, wherein one or more of the functions are automatically associated.

86. The computer program of claim 83, further comprising a sixth computer code for generating a report representing a configuration of one or more of the devices.

87. The computer program of claim 86, wherein one or more of the devices comprise physical devices.

88. The computer program of claim 87, wherein the control area network comprises one or more of the physical devices, and the configuration data is transmitted to at least one of the physical devices.

89. The computer program of claim 83, further comprising:
sixth computer code for generating configuration data for at least one of the associated devices based on the associated functions; and
a seventh computer code for transmitting the configuration data across the control area network.

90. The computer program of claim 89, wherein the control area network comprises a master controller, and the configuration data is transmitted to the master controller.

91. The computer program of claim 89, wherein one or more of the devices comprise physical devices, and the physical devices of each class of devices have a common attribute selected from the group consisting of a common operation and a common functionality.

92. The computer program of claim 91, further comprising an eighth computer code for communicating between the physical devices and the respective application programming interfaces using one or more event handlers.

93. The computer program of claim 89, wherein one or more of the functions are associated using a device database.

94. The computer program of claim 93, wherein the device database may be configured and updated independent of a new software release of the computer program.

95. The computer program of claim 82, further comprising a fifth computer code for selecting one or more of the devices.

96. The computer program of claim 95, wherein the control area network comprises a master controller and one or more of the devices.

97. The computer program of claim 96, further comprising a sixth computer code for associating one or more of the devices with the master controller.

98. The computer program of claim 97, further comprising a seventh computer code for capturing an IR waveform of at least one of the physical devices.

99. The computer program of claim 97, wherein one or more of the devices are selected from the group consisting of a keypad and touch panel device.

100. The computer program of claim 99, further comprising a seventh computer code for generating a graphical user interface navigation for the keypads and touch panel devices.

101. The computer program of claim 100, further comprising an eighth computer code for generating a report representing a configuration of one or more of the devices.

102. The computer program of claim 101, further comprising:
a ninth computer code for generating configuration data representing the configuration of one or more of the devices; and
a tenth computer code for transmitting the configuration data across the control area network.

103. A method for graphically configuring a device in a control area network, comprising:
providing an application programming interface, wherein the application programming interface corresponds to a class of devices and comprises a set of functions, the class of devices includes one or more devices;
creating a plurality of graphical objects using a graphical user interface, wherein at least one of the graphical objects represents one or more of the devices, and another one of the graphical objects represents a control system;
developing an automation script of at least one of the graphical objects, said automation script operable to configure one or more event handlers for one or more of the devices;
creating conditional logic for the one or more devices based on the functions; and
associating the conditional logic and one or more of the functions of the application programming interfaces with one or more of the devices using the graphical user interface, wherein
the developing of the automation script further comprises using at least one of the graphical objects to configure one or more of the event handlers for one or more of the devices and selecting a category of a step or operation to add, the step or operation comprising general, function, or status.

* * * * *